(12) United States Patent
Douady-Pleven et al.

(10) Patent No.: US 10,757,384 B2
(45) Date of Patent: Aug. 25, 2020

(54) DESATURATION CONTROL

(71) Applicant: GoPro, Inc., San Mateo, CA (US)

(72) Inventors: Bruno César Douady-Pleven, Bures-sur-Yvette (FR); Thomas Nicolas Emmanuel Veit, Meudon (FR); Marc Lebrun, Issy-les-Moulineaux (FR)

(73) Assignee: GoPro, Inc., San Mateo, CA (US)

( * ) Notice: Subject to any disclaimer, the term of this patent is extended or adjusted under 35 U.S.C. 154(b) by 114 days.

(21) Appl. No.: 16/043,487

(22) Filed: Jul. 24, 2018

(65) Prior Publication Data

US 2019/0098274 A1    Mar. 28, 2019

Related U.S. Application Data

(60) Provisional application No. 62/564,429, filed on Sep. 28, 2017.

(51) Int. Cl.
| | |
|---|---|
| *G06K 9/00* | (2006.01) |
| *H04N 9/64* | (2006.01) |
| *G06T 7/90* | (2017.01) |
| *H04N 9/04* | (2006.01) |
| *G06T 5/50* | (2006.01) |
| *G06T 5/00* | (2006.01) |

(52) U.S. Cl.
CPC ............. *H04N 9/646* (2013.01); *G06T 5/002* (2013.01); *G06T 5/50* (2013.01); *G06T 7/90* (2017.01); *H04N 9/04517* (2018.08); *G06T 2207/10024* (2013.01); *G06T 2207/20182* (2013.01)

(58) Field of Classification Search
None
See application file for complete search history.

(56) References Cited

U.S. PATENT DOCUMENTS

2010/0195906 A1\*   8/2010   Uliyar ..................... G06T 5/008
                                                                   382/167

\* cited by examiner

*Primary Examiner* — Soo Jin Park
(74) *Attorney, Agent, or Firm* — Young Basile Hanlon & MacFarlane, P.C.

(57) ABSTRACT

Image signal processing may include desaturation control, which may include adaptive desaturation control. Image signal processing with desaturation control may include obtaining, by an image signal processor, from an image sensor, an input image signal representing an input image, obtaining, by the image signal processor, color correction information for the input image, obtaining a color corrected image based on the input image using color correction with desaturation control such that inaccurate colorization of the color corrected image is minimized, and outputting the color corrected image.

14 Claims, 13 Drawing Sheets

DESATURATION CONTROL

CROSS REFERENCE TO RELATED APPLICATIONS

This application claims the benefit of U.S. Provisional Application No. 62/564,429, filed Sep. 28, 2017, the contents of which are incorporated by reference herein in its entirety.

COPYRIGHT

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

TECHNICAL FIELD

The present disclosure relates to digital image and video processing, including temporal and spatial image noise reduction, local motion compensation, spatially combining images, image distortion compensation, bitrate allocation, image alignment, prevention of highlight clipping, and reduction in lens flare.

BACKGROUND

Image capture devices, such as cameras, may capture content as images or video. Light may be received and focused via a lens and may be converted to an electronic image signal by an image sensor. The image signal may be processed by an image signal processor to form an image, which may be stored and/or encoded. In some implementations, multiple images or video frames may include spatially adjacent or overlapping content. Accordingly, systems, methods, and apparatus for capturing, processing, and/or encoding images, video, or both may be advantageous.

SUMMARY

The present disclosure satisfies the foregoing needs by providing, inter alia, apparatus and methods for image signal processing based encoding hints for motion estimation.

An aspect of the disclosure relates to a non-transitory computer-readable storage medium, comprising executable instructions that, when executed by a processor, facilitate performance of operations including obtaining, by an image signal processor, from an image sensor, an input image signal representing an input image, obtaining, by the image signal processor, color correction information for the input image, obtaining a color corrected image based on the input image using color correction with desaturation control such that inaccurate colorization of the color corrected image is minimized, and outputting the color corrected image.

Another aspect of the disclosure is a method for digital image and video processing. The method may include obtaining, by an image signal processor, from an image sensor, an input image signal representing an input image, obtaining, by the image signal processor, color correction information for the input image, obtaining a color corrected image based on the input image using color correction with desaturation control such that inaccurate colorization of the color corrected image is minimized, and outputting the color corrected image.

Another aspect of the disclosure is an apparatus. The apparatus includes an image sensor, and an image signal processor configured to obtain, from the image sensor, an input image signal representing an input image, obtain color correction information for the input image, obtain a color corrected image based on the input image using color correction with desaturation control such that inaccurate colorization of the color corrected image is minimized, and output the color corrected image.

These and other objects, features, and characteristics of the apparatus, system, and/or method disclosed herein, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the disclosure. As used in the specification and in the claims, the singular forms of "a," "an," and "the" include plural referents unless the context clearly dictates otherwise.

BRIEF DESCRIPTION OF THE DRAWINGS

The disclosed embodiments have other advantages and features which will be more readily apparent from the detailed description, the appended claims, and the accompanying figures. A brief introduction of the figures is below.

All figures disclosed herein are © Copyright 2018 GoPro Inc. All rights reserved.

DETAILED DESCRIPTION

Implementations of the present technology will now be described in detail with reference to the drawings, which are provided as examples so as to enable those skilled in the art to practice the technology. The figures and examples are not meant to limit the scope of the present disclosure to a single implementation or embodiment, and other implementations and embodiments are possible by way of interchange of, or combination with, some or all of the described or illustrated elements. Wherever convenient, the same reference numbers will be used throughout the drawings to refer to same or like parts.

Content, such as visual content, may be captured as one or more images or video frames by one or more image capture devices, such as a camera or camera array. An image capture device may include one or more lenses, image sensors, image signal processors, encoders, or combinations thereof. A lens may receive and focus light on an image sensor or sensors. An image sensor or sensors may sample the light and generate an electronic image signal. An image analysis unit may receive the image signal from one or more image sensors and may analyze the image signal to obtain image analysis information. An image signal processor (ISP) may receive the image signal from one or more image sensors and may process the image signal to generate one or more processed images, pictures, or frames, such as based on the image analysis information.

Image analysis and processing may include color correction to reduce or eliminate some artifacts, such as white balance artifacts or color lens shading artifacts. Image analysis may include obtaining color correction information, such as automatic white balance correction information or color lens shading correction information, or both. Image signal processing may include obtaining a color lens shading corrected image based on the input image and the color lens shading correction information. Image signal processing may include obtaining and automatic white balance corrected image based on the input image, or the color lens shading corrected image, and the automatic white balance correction information. The automatic white balance corrected image or the color lens shading corrected image may include color correction artifacts, such as artificial or inaccurate colors. Color correction with desaturation control, which may include color correction with adaptive desaturation control, may reduce or eliminate color correction artifacts and improve color accuracy.

Figure 1:
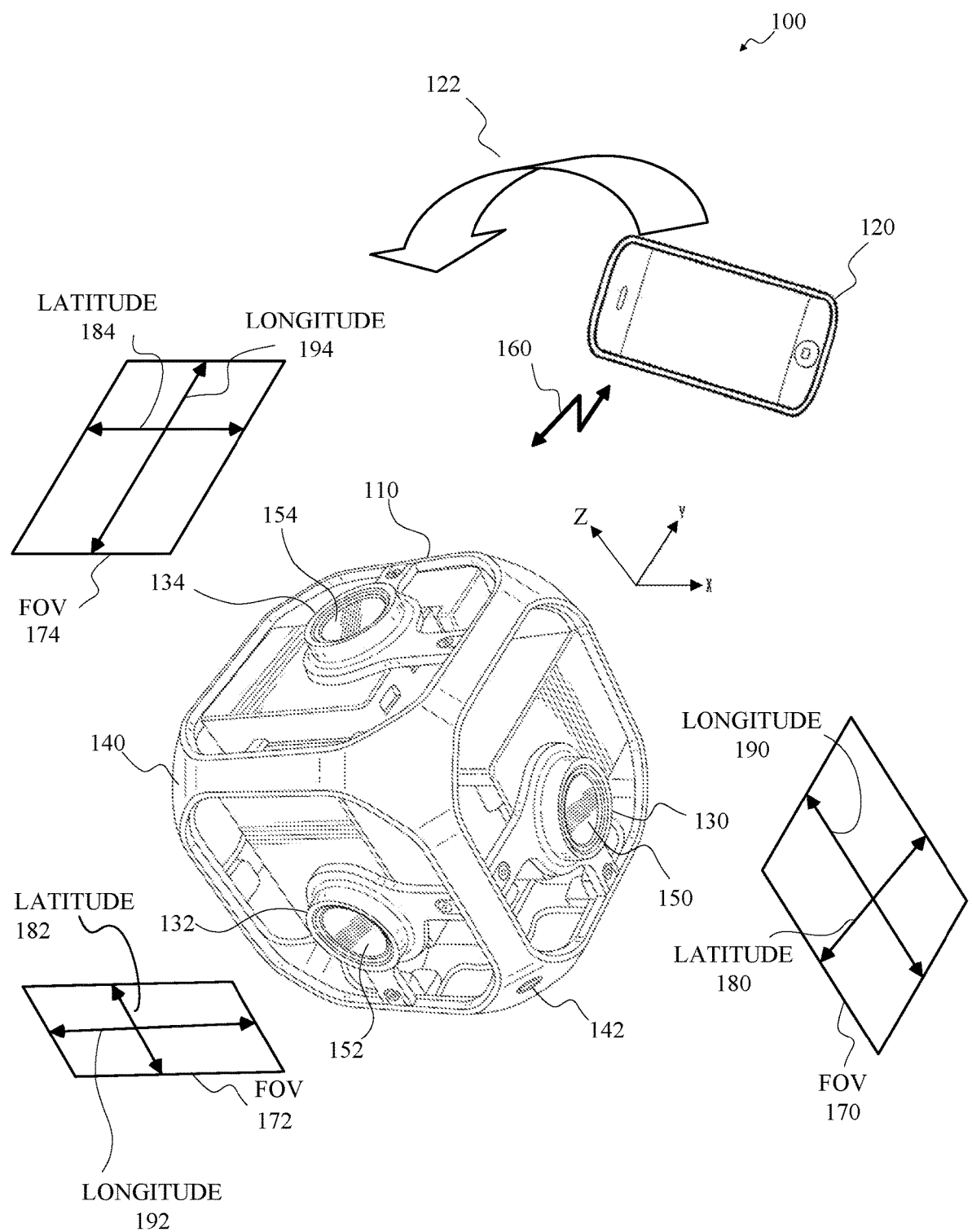
FIG. 1 is a diagram of an example of an image capture system for content capture in accordance with implementations of this disclosure.

FIG. 1 is a diagram of an example of an image capture system 100 for content capture in accordance with implementations of this disclosure. As shown in FIG. 1, an image capture system 100 includes an image capture apparatus 110, and may include an external user interface (UI) device 120.

In some implementations, the image capture apparatus 110 may be a multi-face apparatus and may include multiple image capture devices, such as image capture devices 130, 132, 134 as shown in FIG. 1, arranged in a structure 140, such as a cube-shaped cage as shown. Although three image capture devices 130, 132, 134 are shown for simplicity in FIG. 1, the image capture apparatus 110 may include any number of image capture devices. For example, the image capture apparatus 110 shown in FIG. 1 may include six cameras, which may include the three image capture devices 130, 132, 134 shown and three cameras not shown.

In some implementations, the structure 140 may have dimensions, such as between 25 mm and 150 mm. For example, the length of the sides of the structure 140 may be 105 mm. The structure 140 may include a mounting port 142, which may be removably attachable to a supporting structure, such as a tripod, a photo stick, or any other camera mount (not shown). The structure 140 may be a rigid support structure, such that the relative orientation of the image capture devices 130, 132, 134 of the image capture apparatus 110 may be maintained in relatively static or fixed alignment, except as described herein.

The image capture apparatus 110 may obtain, or capture, image content, such as images, video, or both, with a 360° field-of-view, which may be referred to herein as panoramic or spherical content. For example, respective image capture devices 130, 132, 134 may include respective lenses, for receiving and focusing light, and respective image sensors for converting the received and focused light to an image signal, such as by measuring or sampling the light, and the multiple image capture devices 130, 132, 134 may be arranged such that respective image sensors and lenses capture a combined field-of-view characterized by a spherical or near spherical field-of-view.

In some implementations, respective image capture devices 130, 132, 134 may have a respective field-of-view 170, 172, 174, such as a field-of-view 170, 172, 174 that 90° in a lateral, or latitudinal, dimension 180, 182, 184 and includes 120° in a longitudinal dimension 190, 192, 194. In some implementations, image capture devices 130, 132, 134 having overlapping fields-of-view 170, 172, 174, or the image sensors thereof, may be oriented at defined angles, such as at 90°, with respect to one another. In some implementations, the image sensor of the image capture device 130 is directed along the X axis, the image sensor of the image capture device 132 is directed along the Y axis, and the image sensor of the image capture device 134 is directed along the Z axis. The respective fields-of-view 170, 172, 174 for adjacent image capture devices 130, 132, 134 may be oriented to allow overlap for a stitching function. For example, the longitudinal dimension 190 of the field-of-view 170 for the image capture device 130 may be oriented at 90° with respect to the lateral dimension 184 of the field-of-view 174 for the image capture device 134, the lateral dimension 180 of the field-of-view 170 for the image capture device 130 may be oriented at 90° with respect to the longitudinal dimension 192 of the field-of-view 172 for the image capture device 132, and the lateral dimension 182 of the field-of-view 172 for the image capture device 132 may be oriented at 90° with respect to the longitudinal dimension 194 of the field-of-view 174 for the image capture device 134.

The image capture apparatus 110 shown in FIG. 1 may have 420° angular coverage in vertical and/or horizontal planes by the successive overlap of 90°, 120°, 90°, 120° respective fields-of-view 170, 172, 174 (not all shown) for four adjacent image capture devices 130, 132, 134 (not all shown). For example, fields-of-view 170, 172 for the image capture devices 130, 132 and fields-of-view (not shown) for two image capture devices (not shown) opposite the image capture devices 130, 132 respectively may be combined to provide 420° angular coverage in a horizontal plane. In some implementations, the overlap between fields-of-view of image capture devices 130, 132, 134 having a combined field-of-view including less than 360° angular coverage in a vertical and/or horizontal plane may be aligned and merged or combined to produce a panoramic image. For example, the image capture apparatus 110 may be in motion, such as rotating, and source images captured by at least one of the image capture devices 130, 132, 134 may be combined to form a panoramic image. As another example, the image capture apparatus 110 may be stationary, and source images captured contemporaneously by respective image capture device 130, 132, 134 may be combined to form a panoramic image.

In some implementations, an image capture device 130, 132, 134 may include a lens 150, 152, 154 or another optical element. An optical element may include one or more lens, macro lens, zoom lens, special-purpose lens, telephoto lens, prime lens, achromatic lens, apochromatic lens, process lens, wide-angle lens, ultra-wide-angle lens, fisheye lens, infrared lens, ultraviolet lens, perspective control lens, other lens, and/or other optical element. In some implementations, a lens 150, 152, 154 may be a fisheye lens and produce fisheye, or near-fisheye, field-of-view images. For example, the respective lenses 150, 152, 154 of the image capture devices 130, 132, 134 may be fisheye lenses. In some implementations, images captured by two or more image capture devices 130, 132, 134 of the image capture apparatus 110 may be combined by stitching or merging fisheye projections of the captured images to produce an equirectangular planar image. For example, a first fisheye image may be a round or elliptical image, and may be transformed to a first rectangular image, a second fisheye image may be a round or elliptical image, and may be transformed to a second rectangular image, and the first and second rectangular images may be arranged side-by-side, which may include overlapping, and stitched together to form the equirectangular planar image.

Although not expressly shown in FIG. 1, In some implementations, an image capture device 130, 132, 134 may include one or more image sensors, such as a charge-coupled device (CCD) sensor, an active pixel sensor (APS), a complementary metal-oxide semiconductor (CMOS) sensor, an N-type metal-oxide-semiconductor (NMOS) sensor, and/or any other image sensor or combination of image sensors.

Although not expressly shown in FIG. 1, In some implementations, an image capture apparatus 110 may include one or more microphones, which may receive, capture, and record audio information, which may be associated with images acquired by the image sensors.

Although not expressly shown in FIG. 1, the image capture apparatus 110 may include one or more other information sources or sensors, such as an inertial measurement unit (IMU), a global positioning system (GPS) receiver component, a pressure sensor, a temperature sensor, a heart rate sensor, or any other unit, or combination of units, that may be included in an image capture apparatus.

In some implementations, the image capture apparatus 110 may interface with or communicate with an external device, such as the external user interface (UI) device 120, via a wired (not shown) or wireless (as shown) computing communication link 160. Although a single computing communication link 160 is shown in FIG. 1 for simplicity, any number of computing communication links may be used. Although the computing communication link 160 shown in FIG. 1 is shown as a direct computing communication link, an indirect computing communication link, such as a link including another device or a network, such as the internet, may be used. In some implementations, the computing communication link 160 may be a Wi-Fi link, an infrared link, a Bluetooth (BT) link, a cellular link, a ZigBee link, a near field communications (NFC) link, such as an ISO/IEC 23243 protocol link, an Advanced Network Technology interoperability (ANT+) link, and/or any other wireless communications link or combination of links. In some implementations, the computing communication link 160 may be a High-Definition Multimedia Interface (HDMI) link, a Universal Serial Bus (USB) link, a digital video interface link, a display port interface link, such as a Video Electronics Standards Association (VESA) digital display interface link, an Ethernet link, a Thunderbolt link, and/or other wired computing communication link.

In some implementations, the user interface device 120 may be a computing device, such as a smartphone, a tablet computer, a phablet, a smart watch, a portable computer, and/or another device or combination of devices configured to receive user input, communicate information with the image capture apparatus 110 via the computing communication link 160, or receive user input and communicate information with the image capture apparatus 110 via the computing communication link 160.

In some implementations, the image capture apparatus 110 may transmit images, such as panoramic images, or portions thereof, to the user interface device 120 via the computing communication link 160, and the user interface device 120 may store, process, display, or a combination thereof the panoramic images.

In some implementations, the user interface device 120 may display, or otherwise present, content, such as images or video, acquired by the image capture apparatus 110. For example, a display of the user interface device 120 may be a viewport into the three-dimensional space represented by the panoramic images or video captured or created by the image capture apparatus 110.

In some implementations, the user interface device 120 may communicate information, such as metadata, to the image capture apparatus 110. For example, the user interface device 120 may send orientation information of the user interface device 120 with respect to a defined coordinate system to the image capture apparatus 110, such that the image capture apparatus 110 may determine an orientation of the user interface device 120 relative to the image capture apparatus 110. Based on the determined orientation, the image capture apparatus 110 may identify a portion of the panoramic images or video captured by the image capture apparatus 110 for the image capture apparatus 110 to send to the user interface device 120 for presentation as the viewport. In some implementations, based on the determined orientation, the image capture apparatus 110 may determine the location of the user interface device 120 and/or the dimensions for viewing of a portion of the panoramic images or video.

In an example, a user may rotate, or sweep, the user interface device 120 through an arc or path 122 in space, as indicated by the arrow shown at 122 in FIG. 1. The user interface device 120 may communicate display orientation information to the image capture apparatus 110 using a communication interface such as the computing communication link 160. The image capture apparatus 110 may provide an encoded bitstream to enable viewing of a portion of the panoramic content corresponding to a portion of the environment of the display location as the image capture apparatus 110 traverses the path 122. Accordingly, display orientation information from the user interface device 120 may be transmitted to the image capture apparatus 110 to control user selectable viewing of captured images and/or video.

In some implementations, the image capture apparatus 110 may communicate with one or more other external devices (not shown) via wired or wireless computing communication links (not shown).

In some implementations, data, such as image data, audio data, and/or other data, obtained by the image capture apparatus 110 may be incorporated into a combined multimedia stream. For example, the multimedia stream may include a video track and/or an audio track. As another example, information from various metadata sensors and/or sources within and/or coupled to the image capture apparatus 110 may be processed to produce a metadata track associated with the video and/or audio track. The metadata track may include metadata, such as white balance metadata, image sensor gain metadata, sensor temperature metadata, exposure time metadata, lens aperture metadata, bracketing configuration metadata and/or other parameters. In some implementations, a multiplexed stream may be generated to incorporate a video and/or audio track and one or more metadata tracks.

In some implementations, the user interface device 120 may implement or execute one or more applications, such as GoPro Studio, the GoPro App, or both, to manage or control the image capture apparatus 110. For example, the user interface device 120 may include an application for controlling camera configuration, video acquisition, video display, or any other configurable or controllable aspect of the image capture apparatus 110.

In some implementations, the user interface device 120, such as via an application, such as the GoPro App, may generate and share, such as via a cloud-based or social media service, one or more images, or short video clips, such as in response to user input.

In some implementations, the user interface device 120, such as via an application, such as the GoPro App, may remotely control the image capture apparatus 110, such as in response to user input.

In some implementations, the user interface device 120, such as via an application, such as the GoPro App, may display unprocessed or minimally processed images or video captured by the image capture apparatus 110 contemporaneously with capturing the images or video by the image capture apparatus 110, such as for shot framing, which may be referred to herein as a live preview, and which may be performed in response to user input.

In some implementations, the user interface device 120, such as via an application, such as the GoPro App, may mark one or more key moments contemporaneously with capturing the images or video by the image capture apparatus 110, such as with a HiLight Tag, such as in response to user input.

In some implementations, the user interface device 120, such as via an application, such as the GoPro App, may display, or otherwise present, marks or tags associated with images or video, such as HiLight Tags, such as in response to user input. For example, marks may be presented in a GoPro Camera Roll application for location review and/or playback of video highlights.

In some implementations, the user interface device 120, such as via an application, such as the GoPro App, may wirelessly control camera software, hardware, or both. For example, the user interface device 120 may include a web-based graphical interface accessible by a user for selecting a live or previously recorded video stream from the image capture apparatus 110 for display on the user interface device 120.

In some implementations, the user interface device 120 may receive information indicating a user setting, such as an image resolution setting, such as 3840 pixels by 2160 pixels, a frame rate setting, such as sixty frames per second (fps), a location setting, and/or a context setting, which may indicate an activity, such as mountain biking, in response to user input, and may communicate the settings, or related information, to the image capture apparatus 110.

Figure 2:
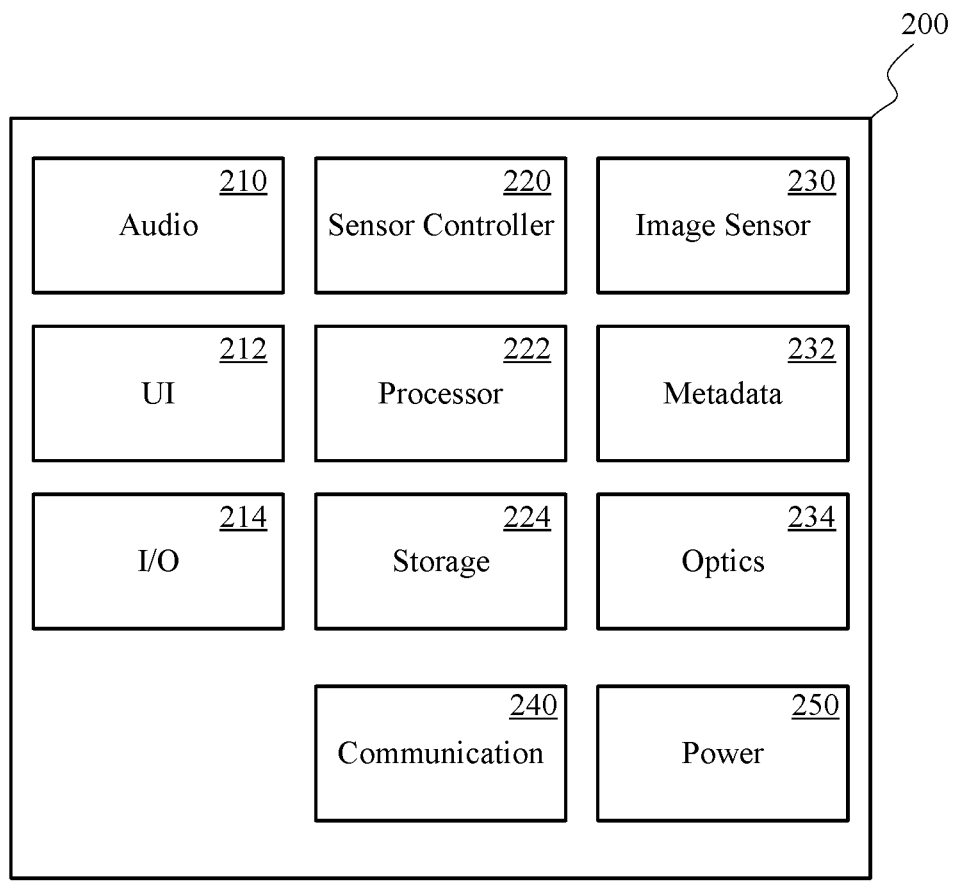
FIG. 2 is a block diagram of an example of an image capture device in accordance with implementations of this disclosure.

FIG. 2 is a block diagram of an example of an image capture device 200 in accordance with implementations of this disclosure. In some implementations, an image capture device 200, such as one of the image capture devices 130, 132, 134 shown in FIG. 1, which may be an action camera, may include an audio component 210, a user interface (UI) unit 212, an input/output (I/O) unit 214, a sensor controller 220, a processor 222, an electronic storage unit 224, an image sensor 230, a metadata unit 232, an optics unit 234, a communication unit 240, a power system 250, or a combination thereof.

In some implementations, the audio component 210, which may include a microphone, may receive, sample, capture, record, or a combination thereof audio information, such as sound waves, which may be associated with, such as stored in association with, image or video content contemporaneously captured by the image capture device 200. In some implementations, audio information may be encoded using, for example, Advanced Audio Coding (AAC), Audio Compression-3 (AC3), Moving Picture Experts Group Layer-3 Audio (MP3), linear Pulse Code Modulation (PCM), Motion Picture Experts Group-High efficiency coding and media delivery in heterogeneous environments (MPEG-H), and/or other audio coding formats or codecs. In one or more implementations of spherical video and/or audio, the audio codec may include a three-dimensional audio codec, such as Ambisonics. For example, an Ambisonics codec can produce full surround audio including a height dimension. Using a G-format Ambisonics codec, a special decoder may be omitted.

In some implementations, the user interface unit 212 may include one or more units that may register or receive input from and/or present outputs to a user, such as a display, a touch interface, a proximity sensitive interface, a light receiving/emitting unit, a sound receiving/emitting unit, a wired/wireless unit, and/or other units. In some implementations, the user interface unit 212 may include a display, one or more tactile elements, such as buttons and/or virtual touch screen buttons, lights (LEDs), speakers, and/or other user interface elements. The user interface unit 212 may receive user input and/or provide information to a user related to the operation of the image capture device 200.

In some implementations, the user interface unit 212 may include a display unit that presents information related to camera control or use, such as operation mode information, which may include image resolution information, frame rate information, capture mode information, sensor mode information, video mode information, photo mode information, or a combination thereof, connection status information, such as connected, wireless, wired, or a combination thereof, power mode information, such as standby mode information, sensor mode information, video mode information, or a combination thereof, information related to other information sources, such as heart rate information, global positioning system information, or a combination thereof, and/or other information.

In some implementations, the user interface unit 212 may include a user interface component such as one or more buttons, which may be operated, such as by a user, to control camera operations, such as to start, stop, pause, and/or resume sensor and/or content capture. The camera control associated with respective user interface operations may be defined. For example, the camera control associated with respective user interface operations may be defined based on the duration of a button press, which may be pulse width modulation, a number of button presses, which may be pulse code modulation, or a combination thereof. In an example, a sensor acquisition mode may be initiated in response to detecting two short button presses. In another example, the initiation of a video mode and cessation of a photo mode, or the initiation of a photo mode and cessation of a video mode, may be triggered or toggled in response to a single short button press. In another example, video or photo capture for a given time duration or a number of frames, such as burst capture, may be triggered in response to a single short button press. Other user command or communication implementations may also be implemented, such as one or more short or long button presses.

In some implementations, the I/O unit 214 may synchronize the image capture device 200 with other cameras and/or with other external devices, such as a remote control, a second image capture device, a smartphone, a user interface device, such as the user interface device 120 shown in FIG. 1, and/or a video server. The I/O unit 214 may communicate information between I/O components. In some implementations, the I/O unit 214 may be connected to the communication unit 240 to provide a wired and/or wireless communications interface, such as a Wi-Fi interface, a Bluetooth interface, a USB interface, an HDMI interface, a Wireless USB interface, a Near Field Communication (NFC) interface, an Ethernet interface, a radio frequency transceiver interface, and/or other interfaces, for communication with one or more external devices, such as a user interface device, such as the user interface device 120 shown in FIG. 1, or another metadata source. In some implementations, the I/O unit 214 may interface with LED lights, a display, a button, a microphone, speakers, and/or other I/O components. In some implementations, the I/O unit 214 may interface with an energy source, such as a battery, and/or a Direct Current (DC) electrical source.

In some implementations, the I/O unit 214 of the image capture device 200 may include one or more connections to external computerized devices for configuration and/or management of remote devices, as described herein. The I/O unit 214 may include any of the wireless or wireline interfaces described herein, and/or may include customized or proprietary connections for specific applications.

In some implementations, the sensor controller 220 may operate or control the image sensor 230, such as in response to input, such as user input. In some implementations, the sensor controller 220 may receive image and/or video input from the image sensor 230 and may receive audio information from the audio component 210.

In some implementations, the processor 222 may include a system on a chip (SOC), microcontroller, microprocessor, central processing unit (CPU), digital signal processor (DSP), application-specific integrated circuit (ASIC), graphics processing unit (GPU), and/or other processor that may control the operation and functionality of the image capture device 200. In some implementations, the processor 222 may interface with the sensor controller 220 to obtain and process sensory information, such as for object detection, face tracking, stereo vision, and/or other image processing.

In some implementations, the sensor controller 220, the processor 222, or both may synchronize information received by the image capture device 200. For example, timing information may be associated with received sensor data, and metadata information may be related to content, such as images or videos, captured by the image sensor 230 based on the timing information. In some implementations, the metadata capture may be decoupled from video/image capture. For example, metadata may be stored before, after, and in-between the capture, processing, or storage of one or more video clips and/or images.

In some implementations, the sensor controller 220, the processor 222, or both may evaluate or process received metadata and may generate other metadata information. For example, the sensor controller 220 may integrate the received acceleration information to determine a velocity profile for the image capture device 200 concurrent with recording a video. In some implementations, video information may include multiple frames of pixels and may be encoded using an encoding method, such as H.264, H.265, CineForm and/or other codecs.

Although not shown separately in FIG. 2, one or more of the audio component 210, the user interface unit 212, the I/O unit 214, the sensor controller 220, the processor 222, the electronic storage unit 224, the image sensor 230, the metadata unit 232, the optics unit 234, the communication unit 240, or the power systems 250 of the image capture device 200 may communicate information, power, or both with one or more other units, such as via an electronic communication pathway, such as a system bus. For example, the processor 222 may interface with the audio component 210, the user interface unit 212, the I/O unit 214, the sensor controller 220, the electronic storage unit 224, the image sensor 230, the metadata unit 232, the optics unit 234, the communication unit 240, or the power systems 250 via one or more driver interfaces and/or software abstraction layers. In some implementations, one or more of the units shown in FIG. 2 may include a dedicated processing unit, memory unit, or both (not shown). In some implementations, one or more components may be operable by one or more other control processes. For example, a global positioning system receiver may include a processing apparatus that may provide position and/or motion information to the processor 222 in accordance with a defined schedule, such as values of latitude, longitude, and elevation at 10 Hz.

In some implementations, the electronic storage unit 224 may include a system memory module that may store executable computer instructions that, when executed by the processor 222, perform various functionalities including those described herein. For example, the electronic storage unit 224 may be a non-transitory computer-readable storage medium, which may include executable instructions, and a processor, such as the processor 222 may execute the instruction to perform one or more, or portions of one or more, of the operations described herein. The electronic storage unit 224 may include storage memory for storing content, such as metadata, images, audio, or a combination thereof, captured by the image capture device 200.

In some implementations, the electronic storage unit 224 may include non-transitory memory for storing configuration information and/or processing code for video information and metadata capture, and/or to produce a multimedia stream that may include video information and metadata in accordance with the present disclosure. In some implementations, the configuration information may include capture type, such as video or still image, image resolution, frame rate, burst setting, white balance, recording configuration, such as loop mode, audio track configuration, and/or other parameters that may be associated with audio, video, and/or metadata capture. In some implementations, the electronic storage unit 224 may include memory that may be used by other hardware/firmware/software elements of the image capture device 200.

In some implementations, the image sensor 230 may include one or more of a charge-coupled device sensor, an active pixel sensor, a complementary metal-oxide semiconductor sensor, an N-type metal-oxide-semiconductor sensor, and/or another image sensor or combination of image sensors. In some implementations, the image sensor 230 may be controlled based on control signals from a sensor controller 220.

The image sensor 230 may sense or sample light waves gathered by the optics unit 234 and may produce image data or signals. The image sensor 230 may generate an output signal conveying visual information regarding the objects or other content corresponding to the light waves received by the optics unit 234. The visual information may include one or more of an image, a video, and/or other visual information. For example, the image sensor 230 may sense or sample light waves gathered by the optics unit 234 and may produce image data or signals that include information, such as per-pixel color channel information, representing a number, count, or cardinality of received, sampled, or detected photons for the respective color channel during a corresponding image capture period.

In some implementations, the image sensor 230 may include a video sensor, an acoustic sensor, a capacitive sensor, a radio sensor, a vibrational sensor, an ultrasonic sensor, an infrared sensor, a radar sensor, a Light Detection And Ranging (LIDAR) sensor, a sonar sensor, or any other sensory unit or combination of sensory units capable of detecting or determining information in a computing environment.

In some implementations, the metadata unit 232 may include sensors such as an inertial measurement unit, which may include one or more accelerometers, one or more gyroscopes, a magnetometer, a compass, a global positioning system sensor, an altimeter, an ambient light sensor, a temperature sensor, and/or other sensors or combinations of sensors. In some implementations, the image capture device 200 may contain one or more other sources of metadata information, telemetry, or both, such as image sensor parameters, battery monitor, storage parameters, and/or other information related to camera operation and/or capture of content. The metadata unit 232 may obtain information related to the environment of the image capture device 200 and aspects in which the content is captured.

For example, the metadata unit 232 may include an accelerometer that may provide device motion information including velocity and/or acceleration vectors representative of motion of the image capture device 200. In another example, the metadata unit 232 may include a gyroscope that may provide orientation information describing the orientation of the image capture device 200. In another example, the metadata unit 232 may include a global positioning system sensor that may provide global positioning system coordinates, time, and information identifying a location of the image capture device 200. In another example, the metadata unit 232 may include an altimeter that may obtain information indicating an altitude of the image capture device 200.

In some implementations, the metadata unit 232, or one or more portions thereof, may be rigidly coupled to the image capture device 200 such that motion, changes in orientation, or changes in the location of the image capture device 200 may be accurately detected by the metadata unit 232. Although shown as a single unit, the metadata unit 232, or one or more portions thereof, may be implemented as multiple distinct units. For example, the metadata unit 232 may include a temperature sensor as a first physical unit and a global positioning system unit as a second physical unit. In some implementations, the metadata unit 232, or one or more portions thereof, may be included in an image capture device 200 as shown or may be included in a physically separate unit operatively coupled to, such as in communication with, the image capture device 200.

In some implementations, the optics unit 234 may include one or more of a lens, macro lens, zoom lens, special-purpose lens, telephoto lens, prime lens, achromatic lens, apochromatic lens, process lens, wide-angle lens, ultra-wide-angle lens, fisheye lens, infrared lens, ultraviolet lens, perspective control lens, other lens, and/or other optics component. In some implementations, the optics unit 234 may include a focus controller unit that may control the operation and configuration of the camera lens. The optics unit 234 may receive light from an object and may focus received light onto an image sensor 230. Although not shown separately in FIG. 2, in some implementations, the optics unit 234 and the image sensor 230 may be combined, such as in a combined physical unit, such as a housing.

In some implementations, the communication unit 240 may be coupled to the I/O unit 214 and may include a component, such as a dongle, having an infrared sensor, a radio frequency transceiver and antenna, an ultrasonic transducer, and/or other communications interfaces used to send and receive wireless communication signals. In some implementations, the communication unit 240 may include a local, such as Bluetooth or Wi-Fi, and/or broad range, such as cellular LTE, communications interface for communication between the image capture device 200 and a remote device, such as the user interface device 120 in FIG. 1. The communication unit 240 may communicate using, for example, Ethernet, 802.11, worldwide interoperability for microwave access (WiMAX), 3G, Long Term Evolution (LTE), digital subscriber line (DSL), asynchronous transfer mode (ATM), InfiniBand, PCI Express Advanced Switching, and/or other communication technologies. In some implementations, the communication unit 240 may communicate using networking protocols, such as multiprotocol label switching (MPLS), transmission control protocol/Internet protocol (TCP/IP), User Datagram Protocol (UDP), hypertext transport protocol (HTTP), simple mail transfer protocol (SMTP), file transfer protocol (FTP), and/or other networking protocols.

Information exchanged via the communication unit 240 may be represented using formats including one or more of hypertext markup language (HTML), extensible markup language (XML), and/or other formats. One or more exchanges of information between the image capture device 200 and remote or external devices may be encrypted using encryption technologies including one or more of secure sockets layer (SSL), transport layer security (TLS), virtual private networks (VPNs), Internet Protocol security (IPsec), and/or other encryption technologies.

In some implementations, the one or more power systems 250 supply power to the image capture device 200. For example, for a small-sized, lower-power action camera a wireless power solution, such as battery, solar cell, inductive, such as contactless, power source, rectification, and/or other power supply, may be used.

Consistent with the present disclosure, the components of the image capture device 200 may be remote from one another and/or aggregated. For example, one or more sensor components may be distal from the image capture device 200, such as shown and described with respect to FIG. 1. Multiple mechanical, sensory, or electrical units may be controlled by a learning apparatus via network/radio connectivity.

Figure 3:
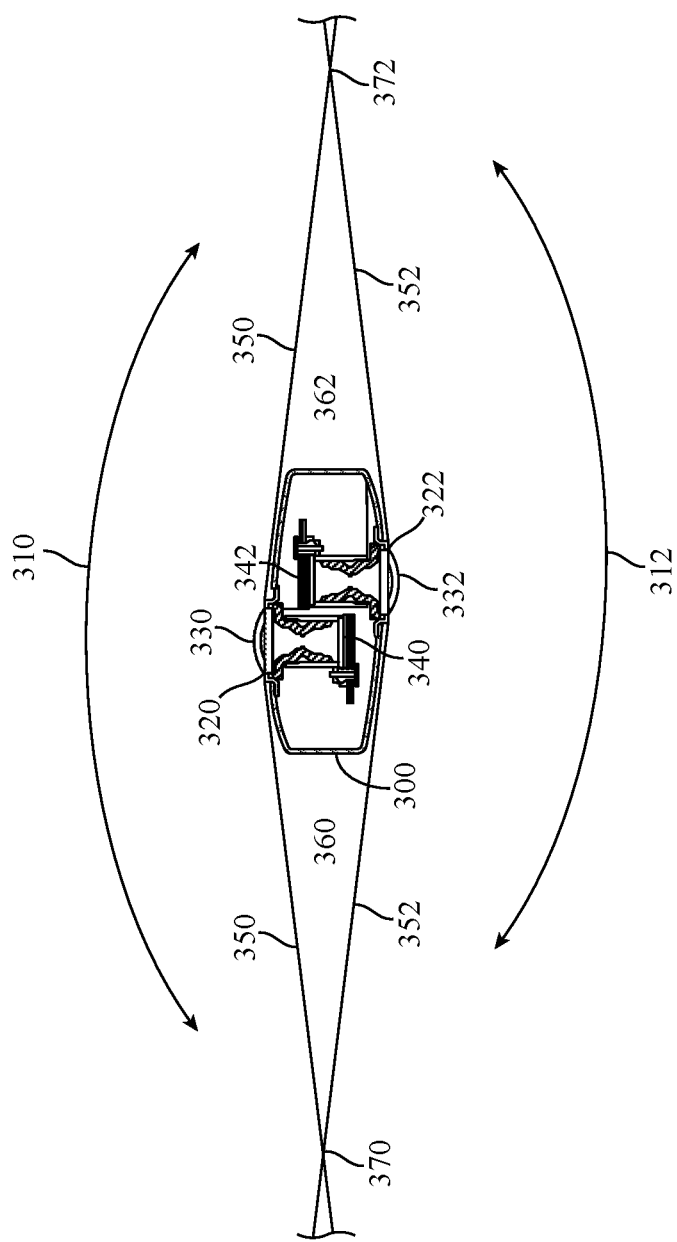
FIG. 3 is a cross-sectional view of an example of an image capture apparatus including overlapping fields-of-view in accordance with implementations of this disclosure.

FIG. 3 is a cross-sectional view of an example of a dual-lens image capture apparatus 300 including overlapping fields-of-view 310, 312 in accordance with implementations of this disclosure. In some implementations, the image capture apparatus 300 may be a spherical image capture apparatus with fields-of-view 310, 312 as shown in FIG. 3. For example, the image capture apparatus 300 includes image capture devices 320, 322, and may include related components, arranged in a back-to-back or Janus configuration. For example, a first image capture device 320 may include a first lens 330 and a first image sensor 340, and a second image capture device 322 may include a second lens 332 and a second image sensor 342 arranged oppositely from the first lens 330 and the first image sensor 340.

The first lens 330 of the image capture apparatus 300 may have the field-of-view 310 shown above a boundary 350. Behind the first lens 330, the first image sensor 340 may capture a first hyper-hemispherical image plane from light entering the first lens 330, corresponding to the first field-of-view 310.

The second lens 332 of the image capture apparatus 300 may have a field-of-view 312 as shown below a boundary 352. Behind the second lens 332, the second image sensor 342 may capture a second hyper-hemispherical image plane from light entering the second lens 332, corresponding to the second field-of-view 312.

In some implementations, one or more areas, such as blind spots 360, 362, may be outside of the fields-of-view 310, 312 of the lenses 330, 332, light may be obscured from the lenses 330, 332 and the corresponding image sensors 340, 342, and content in the blind spots 360, 362 may be omitted from capture. In some implementations, the image capture apparatus 300 may be configured to minimize the blind spots 360, 362.

In some implementations, the fields-of-view 310, 312 may overlap. Stitch points 370, 372, proximal to the image capture apparatus 300, at which the fields-of-view 310, 312 overlap may be referred to herein as overlap points or stitch points. Content captured by the respective lenses 330, 332, distal to the stitch points 370, 372, may overlap.

In some implementations, images contemporaneously captured by the respective image sensors 340, 342 may be combined to form a combined image. Combining the respective images may include correlating the overlapping regions captured by the respective image sensors 340, 342, aligning the captured fields-of-view 310, 312, and stitching the images together to form a cohesive combined image.

In some implementations, a small change in the alignment, such as position and/or tilt, of the lenses 330, 332, the image sensors 340, 342, or both may change the relative positions of their respective fields-of-view 310, 312 and the locations of the stitch points 370, 372. A change in alignment may affect the size of the blind spots 360, 362, which may include changing the size of the blind spots 360, 362 unequally.

In some implementations, incomplete or inaccurate information indicating the alignment of the image capture devices 320, 322, such as the locations of the stitch points 370, 372, may decrease the accuracy, efficiency, or both of generating a combined image. In some implementations, the image capture apparatus 300 may maintain information indicating the location and orientation of the lenses 330, 332 and the image sensors 340, 342 such that the fields-of-view 310, 312, stitch points 370, 372, or both may be accurately determined, which may improve the accuracy, efficiency, or both of generating a combined image.

In some implementations, optical axes through the lenses 330, 332 may be substantially antiparallel to each other, such that the respective axes may be within a tolerance such as 1%, 3%, 5%, 10%, and/or other tolerances. In some implementations, the image sensors 340, 342 may be substantially perpendicular to the optical axes through their respective lenses 330, 332, such that the image sensors may be perpendicular to the respective axes to within a tolerance such as 1%, 3%, 5%, 10%, and/or other tolerances.

In some implementations, the lenses 330, 332 may be laterally offset from each other, may be off-center from a central axis of the image capture apparatus 300, or may be laterally offset and off-center from the central axis. As compared to an image capture apparatus with back-to-back lenses, such as lenses aligned along the same axis, the image capture apparatus 300 including laterally offset lenses 330, 332 may include substantially reduced thickness relative to the lengths of the lens barrels securing the lenses 330, 332. For example, the overall thickness of the image capture apparatus 300 may be close to the length of a single lens barrel as opposed to twice the length of a single lens barrel as in a back-to-back configuration. Reducing the lateral distance between the lenses 330, 332 may improve the overlap in the fields-of-view 310, 312.

In some implementations, images or frames captured by an image capture apparatus, such as the image capture apparatus 110 shown in FIG. 1 or the image capture apparatus 300 shown in FIG. 3, may be combined, merged, or stitched together, to produce a combined image, such as a spherical or panoramic image, which may be an equirectangular planar image. In some implementations, generating a combined image may include three-dimensional, or spatiotemporal, noise reduction (3DNR). In some implementations, pixels along the stitch boundary may be matched accurately to minimize boundary discontinuities.

Figure 4:
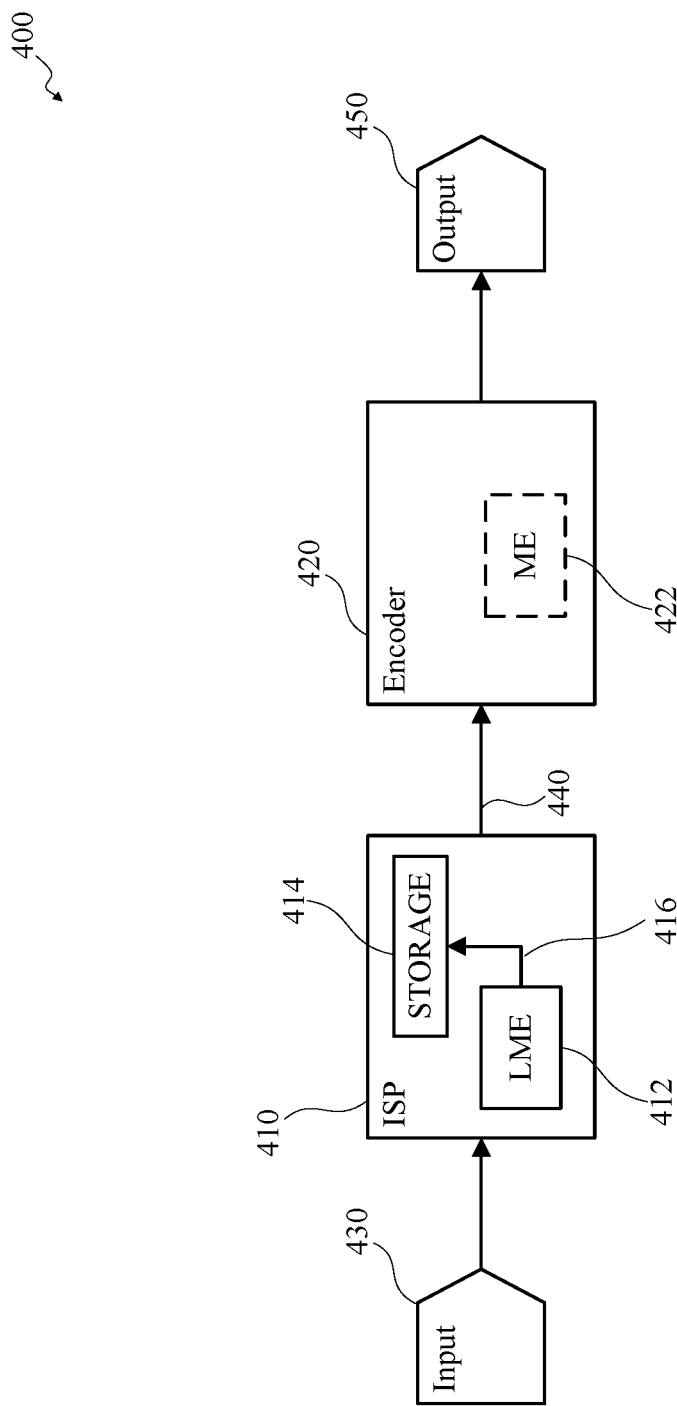
FIG. 4 is a block diagram of an example of an image processing and coding pipeline in accordance with implementations of this disclosure.

FIG. 4 is a block diagram of an example of an image processing and coding pipeline 400 in accordance with implementations of this disclosure. In some implementations, the image processing and coding pipeline 400 may be included in an image capture device, such as the image capture device 200 shown in FIG. 2, or an image capture apparatus, such as the image capture apparatus 110 shown in FIG. 1 or the image capture apparatus 300 shown in FIG. 3. The image processing and coding pipeline 400 includes an image signal processor (ISP) 410 and an encoder 420.

In some implementations, the image signal processor 410 may receive an input image signal 430. For example, an image sensor (not shown), such as image sensor 230 shown in FIG. 2, may capture an image, or a portion thereof, and may send, or transmit, the captured image, or image portion, to the image signal processor 410 as the input image signal 430. In some implementations, an image, or frame, such as an image, or frame, included in the input image signal, may be one of a sequence or series of images or frames of a video, such as a sequence, or series, of frames captured at a rate, or frame rate, which may be a number or cardinality of frames captured per defined temporal period, such as twenty-four, thirty, or sixty frames per second.

In some implementations, the image signal processor 410 may include a local motion estimation (LME) unit 412, which may generate local motion estimation information for use in image signal processing and encoding, such as in correcting distortion, stitching, and/or motion compensation. In some implementations, the local motion estimation unit 412 may partition the input image signal 430 into blocks, such as having 4×4, 16×16, 64×64, and/or other dimensions. In some implementations, the local motion estimation unit 412 may partition the input image signal 430 into arbitrarily shaped patches and/or individual pixels.

In some implementations, the local motion estimation unit 412 may compare pixel values of blocks of pixels between image frames, such as successive image frames, from the input image signal 430 to determine displacement, or movement, between frames. The local motion estimation unit 412 may produce motion vectors, such as an 'x' component and a 'y' component of motion, at multiple locations within an image frame. The motion vectors may be represented by a translational model or other models that may approximate camera motion, such as rotation and translation in three dimensions, and zooming.

In some implementations, the image signal processor 410 of the image processing and coding pipeline 400 may include an internal electronic storage unit 414, such as shared memory, such as random-access memory (RAM), flash, or other types of memory. The internal electronic storage unit 414 may store local motion estimation information 416 determined by the local motion estimation unit 412 for one or more frames. The local motion estimation information 416 and associated image or images may be output 440 to the encoder 420. In some implementations, the internal electronic storage unit 414 may include a buffer, or cache, and may buffer the input image signal as an input, or source, image, or frame.

In some implementations, the image signal processor 410 may output an image, associated local motion estimation information 416, or both as the output 440. For example, the image signal processor 410 may receive the input image signal 430, process the input image signal 430, and output a processed image as the output 440. Processing the input image signal 430 may include generating and using the local motion estimation information 416, spatiotemporal noise reduction (3DNR), dynamic range enhancement, local tone adjustment, exposure adjustment, contrast adjustment, image stitching, and/or other operations.

The encoder 420 may encode or compress the output 440 of the image signal processor 410. In some implementations, the encoder 420 may implement the one or more encoding standards, which may include motion estimation.

In some implementations, the encoder 420 may output encoded video as an encoded output 450. For example, the encoder 420 may receive the output 440 of the image signal processor 410, which may include processed images, the local motion estimation information 416, or both. The encoder 420 may encode the images and may output the encoded images as the encoded output 450.

In some implementations, the encoder 420 may include a motion estimation unit 422 that may determine motion information for encoding the image output 440 of the image signal processor 410. In some implementations, the encoder 420 may encode the image output 440 of the image signal processor 410 using motion information generated by the motion estimation unit 422 of the encoder 420, the local motion estimation information 416 generated by the local motion estimation unit 412 of the image signal processor 410, or a combination thereof.

For example, the motion estimation unit 422 may determine motion information at pixel block sizes that may differ from pixel block sizes used by the local motion estimation unit 412. In another example, the motion estimation unit 422 of the encoder 420 may generate motion information and the encoder may encode the image output 440 of the image signal processor 410 using the motion information generated by the motion estimation unit 422 of the encoder 420 and the local motion estimation information 416 generated by the local motion estimation unit 412 of the image signal processor 410. In another example, the motion estimation unit 422 of the encoder 420 may use the local motion estimation information 416 generated by the local motion estimation unit 412 of the image signal processor 410 as input for efficiently and accurately generating motion information.

In some implementations, the image signal processor 410, the encoder 420, or both may be distinct units, as shown. For example, the image signal processor 410 may include a motion estimation unit, such as the local motion estimation unit 412 as shown, and/or the encoder 420 may include a motion estimation unit, such as the motion estimation unit 422.

In some implementations, the image signal processor 410 may store motion information, such as the local motion estimation information 416, in a memory, such as the internal electronic storage unit 414, and the encoder 420 may read the motion information from the internal electronic storage unit 414 or otherwise receive the motion information from the image signal processor 410. The encoder 420 may use the motion estimation information determined by the image signal processor 410 for motion compensation processing.

Figure 5:
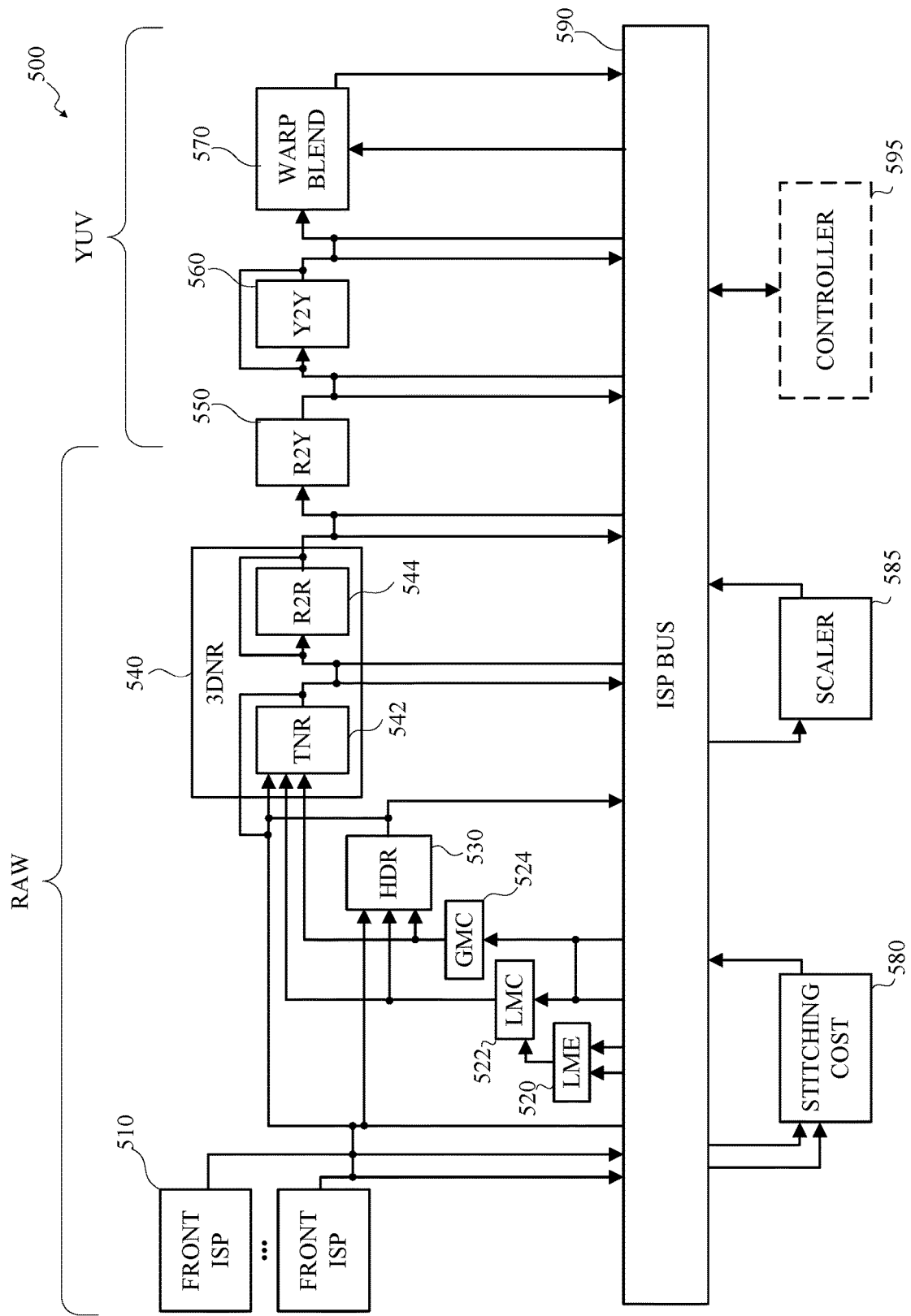
FIG. 5 is a functional block diagram of an example of an image signal processor in accordance with implementations of this disclosure.

FIG. 5 is a functional block diagram of an example of an image signal processor 500 in accordance with implementations of this disclosure. An image signal processor 500 may be included in an image capture device, such as the image capture device 200 shown in FIG. 2, or an image capture apparatus, such as the image capture apparatus 110 shown in FIG. 1 or the image capture apparatus 300 shown in FIG. 3. In some implementations, the image signal processor 500 may be similar to the image signal processor 410 shown in FIG. 4.

The image signal processor 500 receives an image signal, such as from an image sensor (not shown), such as the image sensor 230 shown in FIG. 2, in a defined format, such as a format of the image sensor, which may be referred to herein as "raw," such as "a raw image," "raw image data," "raw data," "a raw signal," or "a raw image signal." For example, the raw image signal may be in a format such as RGB format, which may represent individual pixels using a combination of values or components, such as a red component (R), a green component (G), and a blue component (B). In another example, the raw image signal may be in a Bayer format, wherein a respective pixel may be one of a combination of adjacent pixels, such as a combination of four adjacent pixels, of a Bayer pattern. For clarity, a sequence of pixels forming a Bayer pattern may be referred to herein as a Bayer. In some implementations, the image signal processor 500 may convert the raw image data (RGB data) to another format, such as a format expressing individual pixels using a combination of values or components, such as a luminance, or luma, value (Y), a blue chrominance, or chroma, value (U or Cb), and a red chroma value (V or Cr), such as the YUV or YCbCr formats.

The image signal processor 500 may include a front image signal processor (Front ISP) 510, or multiple front image signal processors as shown, a local motion estimation (LME) unit 520, a local motion compensation (LMC) unit 522, a global motion compensation (GMC) unit 524, a high dynamic range (HDR) unit 530, a three-dimensional noise reduction (3DNR) unit 540, which may include a temporal noise reduction (TNR) unit 542 and a raw to raw (R2R) unit 544, a raw to YUV (R2Y) unit 550, a YUV to YUV (Y2Y) unit 560, a warp and blend unit 570, a stitching cost unit 580, a scaler 585, an image signal processing bus (ISP BUS) 590, a configuration controller 595, or a combination thereof.

Although not shown expressly in FIG. 5, in some implementations, one or more of the front image signal processor 510, the local motion estimation unit 520, the local motion compensation unit 522, the global motion compensation unit 524, the high dynamic range unit 530, the three-dimensional noise reduction unit 540, the temporal noise reduction unit 542, the raw to raw unit 544, the raw to YUV unit 550, the YUV to YUV unit 560, the warp and blend unit 570, the stitching cost unit 580, the scaler 585, the image signal processing bus 590, the configuration controller 595, or any combination thereof, may include a respective clock, power domain, or both.

In some implementations, the front image signal processor 510 may minimally process image signals received from respective image sensors, which may include image scaling. Scaling, by the front image signal processor 510, may include processing pixels, such as a defined cardinality of pixels, corresponding to a determined quality. For example, the front image signal processor 510 may correct dead pixels, perform band processing, decouple vertical blanking, or a combination thereof. In some implementations, the front image signal processor 510 may output a high-resolution frame, one or more downscaled, or reduced, resolution frames, such as a ½×½ resolution frame, a ¼×¼ resolution frame, a ⅛×⅛ resolution frame, a ¹⁄₁₆×¹⁄₁₆ resolution frame, a ¹⁄₃₂×¹⁄₃₂ resolution frame, or any combination thereof.

In some implementations, a multiple camera apparatus, such as the image capture apparatus 110 shown in FIG. 1, may include multiple image capture devices, such as the image capture device 200 shown in FIG. 2, and may include a respective front image signal processor 510 associated with a respective image capture device.

The local motion estimation unit 520 may receive, or otherwise access, an input frame, or one or more portions thereof, which may be a current input frame, such as via the image signal processor bus 590. In some implementations, the local motion estimation unit 520 may receive the current input frame at a downscaled, or reduced, resolution. In some implementations, such as implementations implementing high dynamic range image processing, the current input frame may be a long exposure input frame.

The local motion estimation unit 520 may receive, or otherwise access, a reference frame, or one or more portions thereof, such as via the image signal processor bus 590. The reference frame may be a previously generated motion compensated prior frame, which may be associated with a temporal location preceding a temporal location associated with the current input frame. For example, the reference frame may be a recirculated frame from the temporal noise reduction unit 542. In some implementations, such as implementations including high dynamic range image processing, the reference frame may be a short exposure input frame corresponding to the long exposure current input frame.

In some implementations, the local motion estimation unit 520 may receive, or otherwise access, previously generated motion information, such as previously generated motion vectors for the current input frame or motion information for a previously processed frame.

The local motion estimation unit 520 may determine motion information, such as motion vectors, representing motion between the current input frame and the reference frame, such as motion caused by moving objects in the field-of-view or non-rotational motion, or translation, of the field-of-view. The local motion estimation unit 520 may output the motion information. For example, the local motion estimation unit 520 may output motion vectors to the local motion compensation unit 522.

The local motion compensation unit 522 may receive, or otherwise access, the reference frame, or one or more portions thereof, such as via the image signal processor bus 590. For example, in some implementations, such as implementations implementing high dynamic range image processing, the reference frame may be the short exposure input frame. In another example, in some implementations implementing high dynamic range image processing, the reference frame may be the long exposure input frame.

The local motion compensation unit 522 may receive, or otherwise access, motion information, such as motion vectors, associated with the current input frame. For example, the local motion compensation unit 522 may receive the motion vectors from the local motion estimation unit 520.

The local motion compensation unit 522 may apply the motion vectors to the reference frame, or one or more portions thereof, which may align, or partially align, the reference frame, or one or more portions thereof, with the current input frame, or one or more portions thereof.

The local motion compensation unit 522 may output a local motion compensated reference frame, or one or more portions thereof.

The global motion compensation unit 524 may receive, or otherwise access, the reference frame, or one or more portions thereof, such as via the image signal processor bus 590. For example, in some implementations, such as implementations implementing high dynamic range image processing, the reference frame may be the short exposure input frame. In another example, in some implementations implementing high dynamic range image processing, the reference frame may be the long exposure input frame.

The global motion compensation unit 524 may receive, or otherwise access, global motion information, such as global motion information from a gyroscopic unit of the image capture apparatus, such as a gyroscopic sensor included in the metadata unit 232 shown in FIG. 2, corresponding to the current input frame. The global motion information may indicate a rotational change in the orientation of the field-of-view relative to the content captured in respective images. For example, the global motion information may indicate a horizontal change of the field-of-view, which may indicate that the corresponding camera panned, or rotated, around a vertical axis. In another example, the global motion information may indicate a vertical change of the field-of-view, which may indicate that the camera tilted or rotated around an axis perpendicular to the lens. In another example, the global motion information may indicate a rotational change of the field-of-view relative to the horizon, which may indicate that the camera rolled or rotated around an axis parallel to the lens. The global motion information may be distinct from motion information, such as translation motion information, indicating a change in the geospatial location of the image capture apparatus, which may include a change associated with changing an elevation of the image capture apparatus. In some embodiments, other changes affecting the frame, such as zooming, may be included as global motion.

The global motion compensation unit 524 may apply the global motion information to the reference frame, or one or more portions thereof, which may align, or partially align, the reference frame, or one or more portions thereof, with the current input frame, or one or more portions thereof.

The global motion compensation unit 524 may output a global motion compensated reference frame, or one or more portions thereof.

The high dynamic range unit 530 may receive, or otherwise access, the current input frame, or one or more portions thereof, such as from the front image signal processor 510. The current input frame may be a long exposure input frame corresponding to the short exposure reference frame. The high dynamic range unit 530 may receive, or otherwise access, the local motion compensated reference frame from the local motion compensation unit 522. The high dynamic range unit 530 may receive, or otherwise access, the global motion compensated reference frame from the global motion compensation unit 524.

The high dynamic range unit 530 may generate a high dynamic range image based on the current input image and the local motion compensated reference frame, the global motion compensated reference frame, or a combination thereof. For example, for a respective portion of the reference frame, such as a respective block, a respective pixel, or a respective Bayer, the temporal noise reduction unit 530 may identify a value for the portion based on the corresponding portion of the local motion compensated reference frame or the corresponding portion of the global motion compensated reference frame.

The high dynamic range unit 530 may output the high dynamic range image. For example, the high dynamic range unit 530 may output the high dynamic range image by storing the high dynamic range image in memory, such as shared memory, via the image signal processor bus 590, or the high dynamic range unit 530 may output the high dynamic range image directly to another unit of the image signal processor 500, such as the temporal noise reduction unit 542.

In some implementations, the high dynamic range unit 530 may be omitted, or high dynamic range processing by the high dynamic range unit 530 may be omitted.

The three-dimensional noise reduction unit 540 may include the temporal noise reduction (TNR) unit 542, the raw to raw (R2R) unit 544, or both.

The temporal noise reduction unit 542 may receive the current input frame, or one or more portions thereof, such as from the front image signal processor 510 or via the image signal processor bus 590. In some implementations, such as implementations implementing high dynamic range image processing, the temporal noise reduction unit 542 may receive the high dynamic range input frame, or one or more portions thereof, such as from the high dynamic range unit 530, as the current input frame.

The temporal noise reduction unit 542 may receive, or otherwise access, the local motion compensated reference frame from the local motion compensation unit 522. The temporal noise reduction unit 542 may receive, or otherwise access, the global motion compensated reference frame from the global motion compensation unit 524.

The temporal noise reduction unit 542 may reduce temporal noise in the current input frame, which may include recursively reducing temporal noise in a sequence of input images, such as a video. Recursive temporal noise reduction may include combining a current image with noise feedback information corresponding to a previously processed frame, such as the reference frame, which may be a recirculated frame. For example, the reference frame may be the local motion compensated frame output by the local motion compensation unit 522, the global motion compensated frame output by the global motion compensation unit 524, or a combination thereof. For example, for a respective portion of the reference frame, such as a respective block, a respective pixel, or a respective Bayer, the temporal noise reduction unit 530 may identify a value for the portion based on the corresponding portion of the local motion compensated reference frame or the corresponding portion of the global motion compensated reference frame.

The temporal noise reduction unit 542 may generate output including a pixel value and associated noise variance for the pixel value for one or more pixels of the current input frame.

The raw to raw unit 544 may perform spatial denoising of frames of raw images based on noise variance values received from the temporal noise reduction unit 542. For example, spatial denoising in the raw to raw unit 544 may include multiple passes of image signal processing, including passes at various resolutions.

The raw to YUV unit 550 may demosaic, and/or color process, the frames of raw images, which may include representing respective pixels in the YUV format, which may include a combination of a luminance (Y) component and two chrominance (UV) components.

The YUV to YUV unit 560 may perform local tone mapping of YUV images. In some implementations, the YUV to YUV unit 560 may include multi-scale local tone mapping using a single pass approach or a multi-pass approach on a frame at different scales.

The warp and blend unit 570 may warp images, blend images, or both. In some implementations, the warp and blend unit 570 may warp a corona around the equator of a respective frame to a rectangle. For example, the warp and blend unit 570 may warp a corona around the equator of a respective frame to a rectangle based on the corresponding low-resolution frame generated by the front image signal processor 510.

The warp and blend unit 570 may apply one or more transformations to the frames. In some implementations, spherical images produced by a multi-face camera device, such as the image capture apparatus 110 shown in FIG. 1 or the image capture apparatus 300 shown in FIG. 3, may be warped and/or blended by the warp and blend unit 570 to correct for distortions at image edges. In some implementations, the warp and blend unit 570 may apply a transformation that is subject to a close to identity constraint, wherein a location of a pixel in an input image to the warp and blend unit 570 may be similar to, such as within a defined distance threshold of, a location of a corresponding pixel in an output image from the warp and blend unit 570. For example, the warp and blend unit 570 may include an internal memory, which may have a size, such as 100 lines, which may be smaller than a size of a frame, and the warp and blend unit 570 may process the input image data in raster-in/raster-out order using a transformation that is subject to a close to identity constraint.

In some implementations, the warp and blend unit 570 may apply a transformation that is independent of close to identity constraints, which may include processing the input image data in raster-in/dynamic-out or dynamic-in/raster-out order. For example, the warp and blend unit 570 may transform two or more non-rectilinear, such as fisheye, images to generate a combined frame, such as an equirectangular frame, by processing the input image data in raster-in/dynamic-out or dynamic-in/raster-out order.

The stitching cost unit 580 may generate a stitching cost map as an output. In some implementations, the cost map may be represented as a rectangle having disparity (x) and longitude (y) based on a warping. Respective values of the cost map may be a cost function of a disparity (x) value for a corresponding longitude. Cost maps may be generated for various scales, longitudes, and disparities.

The scaler 585 may scale images received from the output of the warp and blend unit 570, which may be in patches, or blocks, of pixels, such as 16×16 blocks, 8×8 blocks, or patches or blocks of any other size or combination of sizes.

The image signal processing bus 590 may be a bus or interconnect, such as an on-chip interconnect or embedded microcontroller bus interface, for communication between the front image signal processor 510, the temporal noise reduction unit 542, the local motion compensation unit 522, the raw to raw unit 544, the raw to YUV unit 550, the YUV to YUV unit 560, the combined warp and blend unit 570, the stitching cost unit 580, the scaler 585, the configuration controller 595, or any combination thereof.

The configuration controller 595 may coordinate image processing by the front image signal processor 510, the local motion estimation unit 520, the local motion compensation unit 522, the global motion compensation unit 524, the high dynamic range unit 530, the three-dimensional noise reduction unit 540, the temporal noise reduction unit 542, the raw to raw unit 544, the raw to YUV unit 550, the YUV to YUV unit 560, the warp and blend unit 570, the stitching cost unit 580, the scaler 585, the image signal processing bus 590, or any combination thereof, of the image signal processor 500. For example, the configuration controller 595 may control camera alignment model calibration, auto-exposure, auto-white balance, or any other camera calibration or similar process or combination of processes. In some implementations, the configuration controller 595 may be a microcontroller. The configuration controller 595 is shown in FIG. 5 using broken lines to indicate that the configuration controller 595 may be included in the image signal processor 500 or may be external to, and in communication with, the image signal processor 500. The configuration controller 595 may include a respective clock, power domain, or both.

Figure 6:
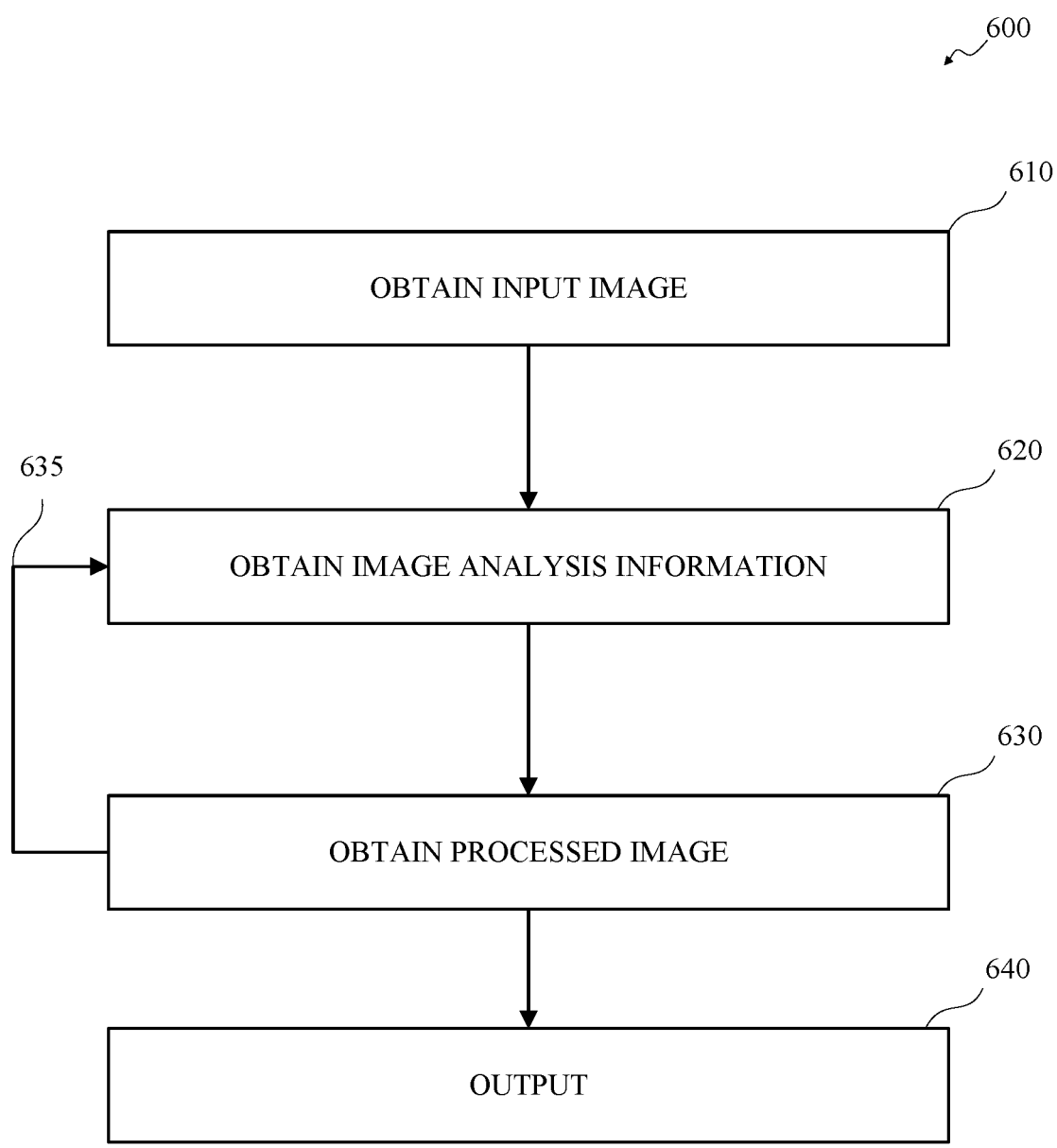
FIG. 6 is a flowchart of an example of image capture and input processing in accordance with implementations of this disclosure.

FIG. 6 is a flowchart of an example of image capture and input processing 600 in accordance with implementations of this disclosure. Image capture and input processing 600 may be implemented in an image capture apparatus, such as the image capture apparatus 110 shown in FIG. 1, or the image capture apparatus 300 shown in FIG. 3.

Image capture and input processing 600 includes obtaining an input image at 610, obtaining image analysis information at 620, obtaining a processed image at 630, and outputting the processed image at 640.

An input image, or frame, may be obtained at 610. For example, an image analysis unit, which may be included in an image capture apparatus, may receive one or more input image signals, such as the input image signal 430 shown in FIG. 4, from one or more image sensors, such as the image sensor 230 shown in FIG. 2 or the image sensors 340, 342 shown in FIG. 3, and may identify or obtain one or more input images, or frames, from the one or more input image signals, which may include buffering the input images or frames. In some implementations, the input images or frames may be associated with respective temporal information indicating a respective temporal location, such as a time stamp, a date stamp, sequence information, or a combination thereof. For example, the input images or frames may be included in a stream, sequence, or series of input images or frames, such as a video, and respective input images or frames may be associated with respective temporal information.

The input image may be represented or expressed in a defined format, such as the Bayer format or the RGB format, wherein the luminance and color of a pixel, or a set of pixels, from the input image is represented as a value or a combination of values, such as a combination of a red channel, or component, value (R), a green channel, or component, value (G), and a blue channel, or component, value (B). Although described with reference to RGB format for simplicity, the techniques described herein may be implemented in another format, such as the Bayer format.

The red component value (R), the green component value (G), and the blue component value (B) may be expressed, respectively, as a magnitude or value, such as an integer value, in a defined range, such as from a defined minimum value (MinSat) to a defined maximum value (MaxSat). For example, a color component value may be expressed as an integer value in the range from zero (MinSat=0) to 100 (MaxSat-100), for simplicity. Other ranges of values or image formats may be used, such as (0-255) or (0-4095). The boundaries of the respective color component value ranges, MinSat and MaxSat, may represent an unsaturated or colorless value, or point, and saturation value, or point, respectively. The color, including luminance and chrominance, of a pixel may correspond to the respective magnitude of the respective color component values and the ratio between the values of the color components.

The color accuracy of an image, or a portion thereof, as representing the captured content may be limited. The term color accuracy, as used herein, refers to one or more objective metrics representing the degree to which an image presented based on captured image data appears consistent with the scene or content captured by the image as observed by the human visual system.

For example, the color accuracy of an input image may be limited by the available range of color component values. Content having color intensity or brightness for a color component that exceeds the corresponding available range of color component values may be clipped, limited, or omitted, from the captured image based on the defined limit on the range of values for the respective color component, which may be referred herein as saturation clipping.

In an example, a first portion of a bright blue object may be captured by a first pixel in an input image and may have a blue component value of 100. A second portion of the bright blue object may be captured by a second pixel in the input image and may have a blue component value of 100, which may be the saturation value for the respective color component. The second portion may be brighter than the first portion and the difference in color between the first portion and the second portion may be clipped, limited, or omitted, from the captured image based on the defined limit on the range of values for the respective color component.

Image capture and input processing 600 may include processing, correcting, or adjusting image data, such as color component values, of an input image to improve color accuracy and limit or remove artifacts. For example, image capture and input processing 600 may include automatic exposure (AE) image correction, automatic white balance (AWB) image correction, color lens shading (CLS) image correction, or any other image correction or combination thereof.

Image analysis information may be obtained at 620. For example, the image analysis unit may preform image analysis, which may include analyzing the input image, or a portion thereof, to obtain or generate the image analysis information.

Image analysis may include obtaining image processing information, such as image processing information associated with a previously processed image as indicated at 635, such as the image or frame sequentially preceding the current input image. For example, the image analysis unit may obtain the image processing information from an image signal processor, such as the image signal processor 410 shown in FIG. 4 or the image signal processor 500 shown in FIG. 5. For example, the image processing information may include color component ratio information for the previously processed image, such as green channel to red channel ratio information (G/R), green channel to blue channel ratio information (G/B), or both.

Image analysis, which may be referred to as camera control, may include obtaining or generating image analysis information including one or more image analysis parameters, such as automatic exposure image analysis parameters, automatic white balance image analysis parameters, color lens shading image analysis parameters, or any other image analysis parameters or combination thereof.

Image analysis may include automatic exposure analysis, which may include obtaining or generating automatic exposure information, which may include automatic exposure image analysis parameters. For example, the automatic exposure information may include automatic exposure level, or brightness level, information, which may include an automatic exposure level value, an automatic exposure level category identifier, or both.

Figure 8:
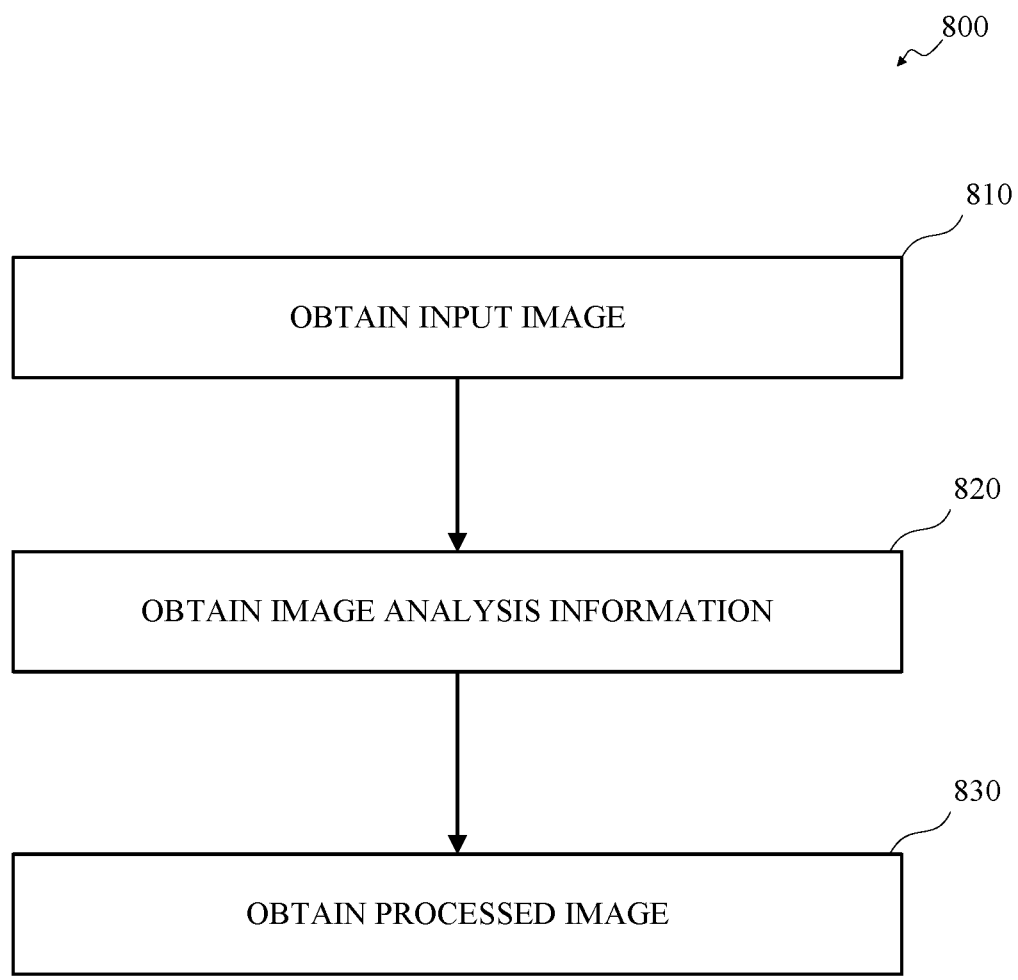
FIG. 8 is a flowchart of an example of color correction with linear desaturation in accordance with implementations of this disclosure.

Image analysis may include automatic white balance analysis, which may include obtaining or generating automatic white balance information, such as automatic white balance image analysis parameters, which may include color temperature information, scene classification information, automatic white balance correction information, such as gains, scales, or correction coefficients, or any other automatic white balance information or combination thereof. An example of obtaining automatic white balance correction information is shown in FIG. 8.

Obtaining scene classification information may include obtaining a scene classification for analysis and processing of the input image, obtaining scene transition information for analysis and processing of the input image, or both. For example, a scene classification for a first image may indicate an underwater scene, a scene classification for a second image, subsequent to the first image, may indicate a scene classification other than an underwater scene, and scene transition information for the second image may indicate a transition from the underwater scene to the scene classification other than underwater.

Image analysis may include color lens shading analysis, which may include obtaining or generating color lens shading information, such as color lens shading image analysis parameters, which may include color lens shading map information, color lens shading scales, gains, or correction coefficients, or any other color lens shading information or combination thereof.

The color lens shading information may include a field-variable gain, which may indicate a gain, scale, or coefficient value as a function of pixel position in the image. For example, color lens shading map information may include a table, or other data storage unit or structure, including coefficients that indicate correction gains corresponding to respective pixel position for color correction of a current image. The color lens shading information may include respective color lens shading information for respective color components, such as color lens shading information for the red component and color lens shading information for the blue component. In some implementations, color lens shading analysis may be performed subsequent to automatic white balance analysis.

A processed image may be obtained or generated at 630. For example, an image signal processor, such as the image signal processor 410 shown in FIG. 4 or the image signal processor 500 shown in FIG. 5, which may be included in the image capture apparatus, may obtain or receive the input image identified at 610, the image analysis information generated at 620, the image processing information associated with the previously processed image as indicated at 635, or a combination thereof. Image signal processing may include generating a processed image corresponding to the input image obtained at 610, which may include color lens shading correction, automatic white balance correction, or any other image processing or combination thereof.

Obtaining the processed image at 630 may include obtaining a color lens shading corrected image. The image capture apparatus may include a color lens shading correction unit implementing color lens shading correction. For example, a raw to raw unit, such as the raw to raw unit 544 shown in FIG. 5, of the image signal processor may implement color lens shading correction.

Obtaining a color lens shading corrected image may include color lens shading correcting the input image obtained at 610 based on the image analysis information obtained at 620, such as the color lens shading correction information.

Figure 12:
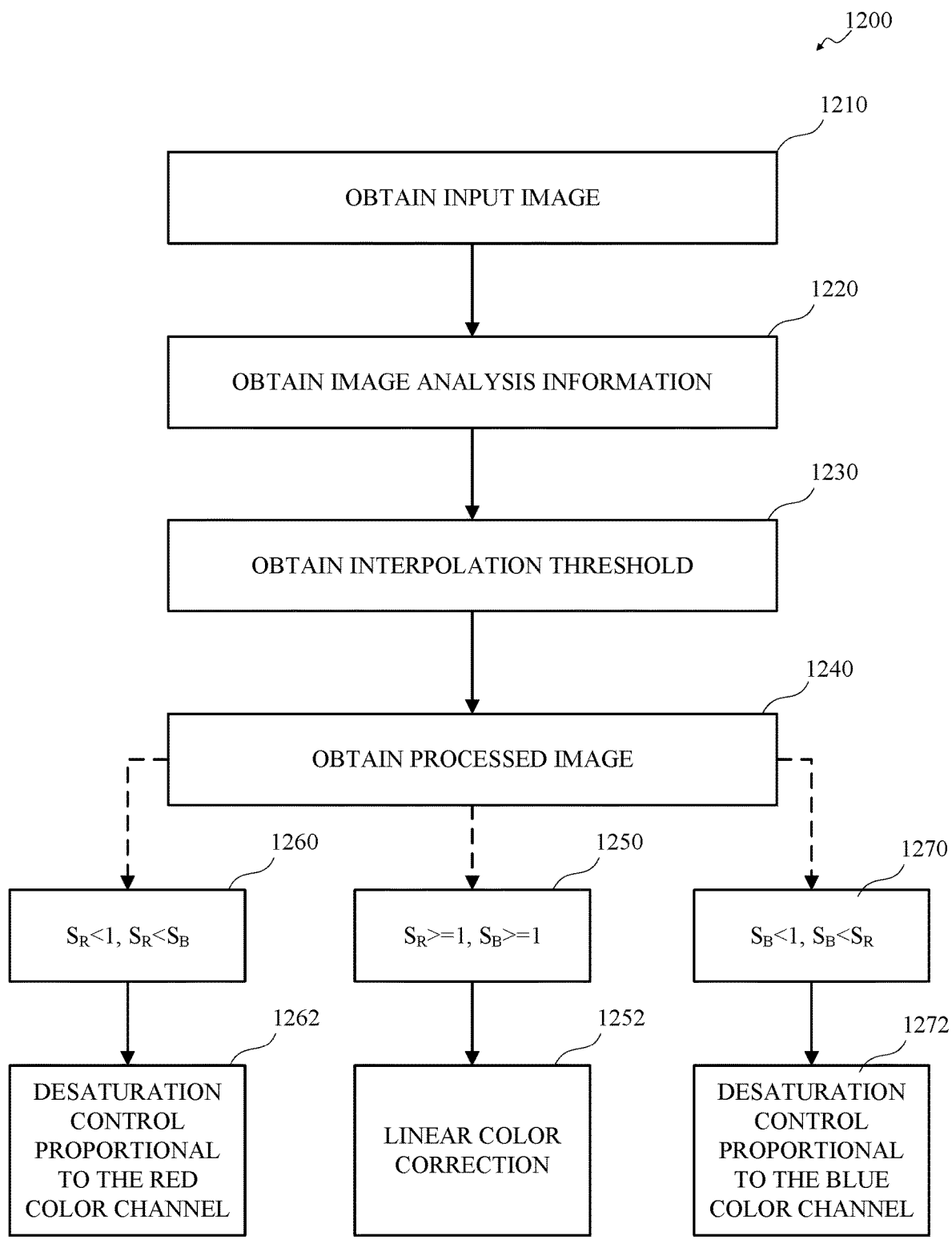
FIG. 12 is a flowchart of an example of color correction with desaturation control in accordance with implementations of this disclosure.
Figure 13:
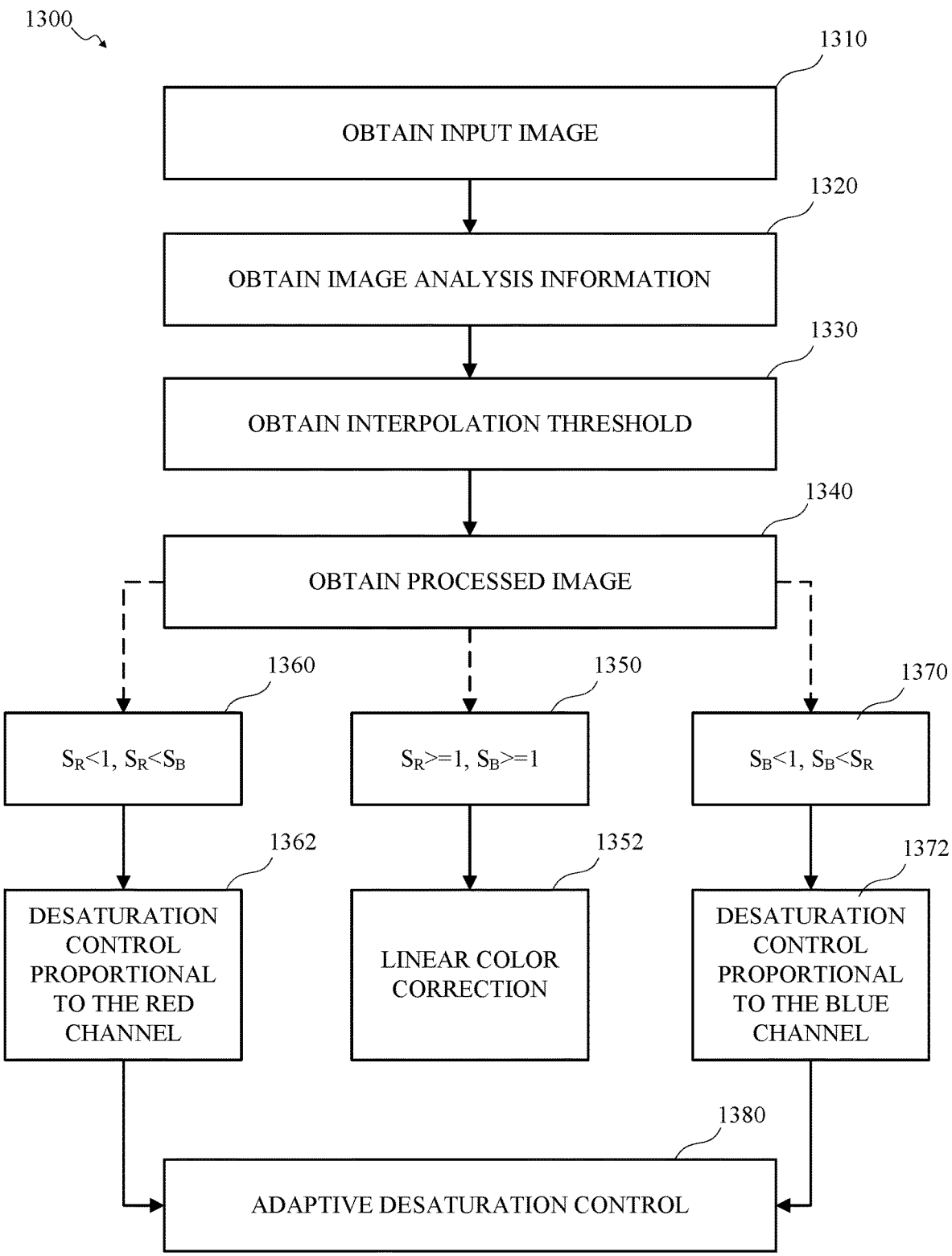
FIG. 13 is a flowchart of an example of color correction with adaptive desaturation control in accordance with implementations of this disclosure.

Color lens shading correction may include obtaining desaturation controlled color lens shading correction information by performing desaturation control based on the color lens shading correction information identified at 620 and obtaining the color lens shading corrected image by color lens shading correcting the input image obtained at 610 based on the desaturation controlled color lens shading correction information. Examples of desaturation control are shown in FIGS. 12 and 13.

Obtaining the processed image at 630 may include obtaining an automatic white balance corrected image. The image capture apparatus may include an automatic white balance correction unit implementing automatic white balance correction. For example, a raw to raw unit, such as the raw to raw unit 544 shown in FIG. 5, of the image signal processor may implement automatic white balance correction. In some implementations, automatic white balance correction may be performed subsequent to color lens shading correction. For example, automatic white balance correction may be performed using the color lens shading corrected image.

Obtaining the automatic white balance corrected image may include automatic white balance correcting the input image obtained at 610, or the color lens shading corrected image, based on the image analysis information obtained at 620, such as the automatic white balance correction information.

Automatic white balance correction may include obtaining desaturation controlled automatic white balance correction information based on the automatic white balance correction information identified at 620 and obtaining the automatic white balance corrected image by automatic white balance correcting the input image obtained at 610 or the color lens shading corrected image based on the desaturation controlled automatic white balance correction information. Examples of desaturation control are shown in FIGS. 12 and 13.

In some implementations, image analysis at 620 and image processing at 630 may be performed sequentially (as shown), or substantially sequentially. Substantially sequentially may indicate that portions or aspects of image analysis at 620 may precede portions or aspects of image processing at 630, and portions or aspects of image analysis at 620 may be performed in parallel or concurrently with portions or aspects of image processing at 630, such that the amount of image analysis that precedes portions or aspects of image processing exceeds the amount of image analysis performed concurrently with portions or aspects of image processing. For example, the amount of image analysis or image processing may be based on a cardinality of operations, clock cycles, or temporal duration.

In some implementations, image analysis at 620 and image processing at 630 may be performed concurrently or in parallel (not expressly shown), or substantially concurrently. Substantially concurrently may indicate that portions or aspects of image analysis at 620 may precede portions or aspects of image processing at 630, and portions or aspects of image analysis at 620 may be performed in parallel or concurrently with portions or aspects of image processing at 630, such that the amount of image analysis that precedes portions or aspects of image processing is less than the amount of image analysis performed concurrently with portions or aspects of image processing. For example, the amount of image analysis or image processing may be based on a cardinality of operations, clock cycles, or temporal duration.

In an example, concurrent image analysis and image processing may include image processing at 630 of a current frame (N) using image analysis information obtained based on image analysis of a first preceding frame (N−1) and image processing information obtained based on image processing of a second preceding frame (N−2), preceding the first preceding frame.

In another example, concurrent image analysis and image processing may include image analysis at 620 of the current frame (N) based on image processing information obtained based on image processing of a preceding frame (N−1) and may include obtaining image analysis information for image processing of a subsequent frame (N+1).

In another example, concurrent image analysis and image processing may include image processing at 630 of the current frame (N) to obtain image processing information for image analysis of a first subsequent frame (N+1) to obtain image analysis information for image processing of a second subsequent frame (N+2), subsequent to the first subsequent frame.

Obtaining a processed image at 630 may include obtaining image processing information, such as color component ratio information for the processed image, such as green channel to red channel ratio information, green channel to blue channel ratio information, or both, and outputting the processed image information as indicated at 635 for image analysis of a subsequent image.

The processed image may be output at 640. For example, the image signal processor may output, send, transmit, or write the processed image, which may include storing the processed image, such as in a memory of the image capture apparatus, such as the electronic storage unit 224 shown in FIG. 2, or otherwise outputting the processed image data such that the processed image data is accessible by another unit of the image signal processor, or another unit of the image capture apparatus, such as an encoder, such as the encoder 420 shown in FIG. 4, for generating an encoded output bitstream, or to an external device.

Figure 7:
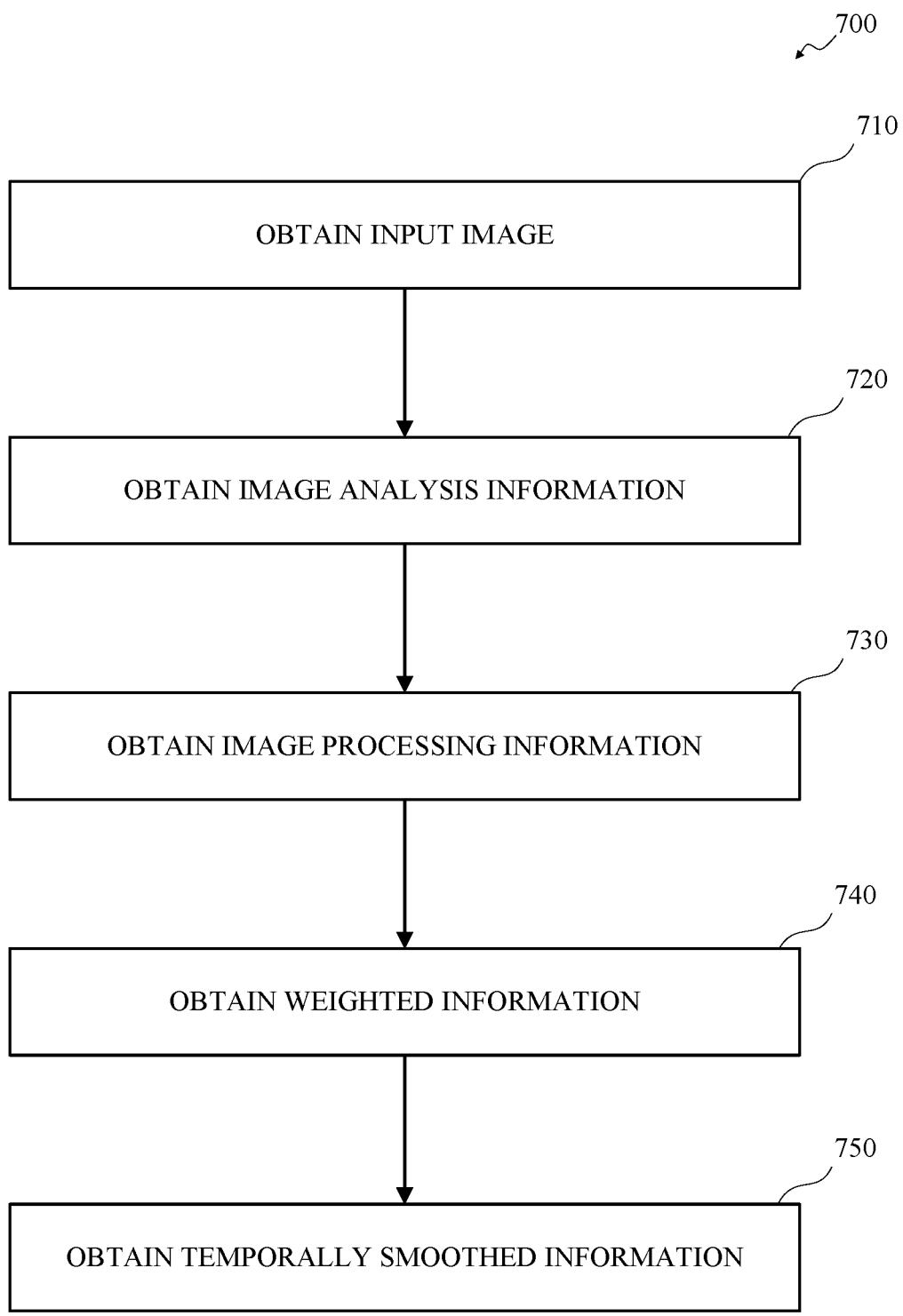
FIG. 7 is a flowchart of an example of obtaining automatic white balance correction information in accordance with implementations of this disclosure.

FIG. 7 is a flowchart of an example of obtaining automatic white balance correction information 700 in accordance with implementations of this disclosure. Obtaining automatic white balance correction information 700 may be implemented in an image capture apparatus, such as the image capture apparatus 110 shown in FIG. 1, or the image capture apparatus 300 shown in FIG. 3.

Obtaining automatic white balance correction information 700 includes obtaining an input image at 710, obtaining image analysis information at 720, obtaining image processing information at 730, obtaining weighted automatic white balance correction information at 740, and obtaining temporally smoothed automatic white balance correction coefficients at 750.

An input image may be obtained at 710. For example, obtaining the input image at 710 may be similar to obtaining an input image as shown at 610 in FIG. 6.

Image analysis information may be obtained at 720. For example, obtaining image analysis information at 720 may include obtaining automatic exposure information for the input image, obtaining color temperature information for the input image, obtaining scene classification information, or a combination thereof.

Obtaining color temperature information may include identifying a color temperature of an illuminant of the scene, such as using a grey world technique, a white point technique, a color by correlation technique, or any other color temperature determination technique.

Image processing information based on a previously processed image may be obtained at 730. Obtaining image processing information at 730 may be similar to obtaining image processing information as shown at 635 in FIG. 6. For example, the image processing information may include automatic white balance processing information obtained from, or based on, processing a previous or preceding image or frame. The image processing information may include color component ratio information for the previously processed image, such as green component (G) to red component (R) ratio information (G/R), green component to blue component (B) ratio information (G/B), or both. A color component ratio value may correspond to a respective pixel from the previously processed image. For example, the image processing information may include respective color component ratio information for each pixel from the previously processed frame, or a portion thereof. The image processing information may include scene classification information used for processing the previously processed image, such as scene classification information generated for an image prior to the preceding image.

Weighted automatic white balance correction information may be obtained at 740. Obtaining weighted automatic white balance correction information may include obtaining automatic white balance correction weighting information, obtaining candidate automatic white balance correction information, obtaining weighted average automatic white balance correction information, or a combination thereof. Obtaining automatic white balance correction weighting information at 910 may include generating the automatic white balance correction weighting information using machine learning, such as supervised machine learning. Obtaining candidate automatic white balance correction information may include obtaining candidate automatic white balance correction coefficient sets, each candidate automatic white balance correction coefficient set corresponding to a respective available automatic white balance correction analysis model. Obtaining the weighted average automatic white balance correction may include combining, such as weighted averaging, the automatic white balance correction weighting information and the candidate automatic white balance correction information.

Temporally smoothed automatic white balance correction information may be obtained at 750. Obtaining temporally smoothed white balance correction information may include obtaining automatic white balance correction temporal smoothing information and obtaining temporally smoothed automatic white balance correction information. The automatic white balance correction temporal smoothing information may indicate a defined limitation of a rate of change of automatic white balance correction information, and may include an automatic white balance correction temporal smoothing, or damping, coefficient or a set of automatic white balance correction temporal smoothing, or damping, coefficients. The temporally smoothed automatic white balance correction information may be obtained as a weighted sum of the reference automatic white balance correction information and the current automatic white balance correction information.

FIG. 8 is a flowchart of an example of color correction with linear desaturation 800 in accordance with implementations of this disclosure. Color correction with linear desaturation 800 may be implemented in an image capture apparatus, such as the image capture apparatus 110 shown in FIG. 1, or the image capture apparatus 300 shown in FIG. 3. For example, a raw to raw unit, such as the raw to raw unit 544 of the image signal processor 500 shown in FIG. 5, may implement color correction with linear desaturation 800.

Color correction with linear desaturation 800 may include obtaining an input image at 810, obtaining image analysis information at 820, and obtaining a processed image at 830.

An input image may be obtained at 810. For example, an image signal processor, such as the image signal processor 410 shown in FIG. 4 or the image signal processor 500 shown in FIG. 5, which may be included in an image capture apparatus, may receive, or otherwise access, one or more input image signals, such as the input image signal 430 shown in FIG. 4, from one or more image sensors, such as the image sensor 230 shown in FIG. 2 or the image sensors 340, 342 shown in FIG. 3, from one or more front image signal processors, such as the front image signal processors 510 shown in FIG. 5, or from an image analysis unit, and may identify one or more input images, or frames, from the one or more input image signals, which may include buffering the input images or frames. In some implementations, the input images or frames may be associated with respective temporal information indicating a respective temporal location, such as a time stamp, a date stamp, sequence information, or a combination thereof. For example, the input images or frames may be included in a stream, sequence, or series of input images or frames, such as a video, and respective input images or frames may be associated with respective temporal information.

In some implementations, the input image obtained at 810 may be a partially processed input image. For example, the color correction may be automatic white balance correction and the input image may be a color lens shading corrected image.

Image analysis information may be obtained at 820. Obtaining image analysis information at 820 may be similar to obtaining image analysis information as shown at 620 in FIG. 6. For example, obtaining image analysis information at 820 may include obtaining automatic exposure information, obtaining color temperature information, obtaining scene classification information, obtaining color correction information, or a combination thereof. For example, the color correction information may include automatic white balance correction information, color lens shading correction information, or both.

The color correction information may include color correction information for adjusting respective color channels. For example, the color correction information may include red component color correction information for correcting the red color channel, green component color correction information for correcting the green color channel, blue component color correction information for correcting the blue color channel, or a combination thereof.

The color correction information may include a color correction coefficient, gain, or scale (S). A color correction coefficient for the red color channel may be expressed as ($S_R$), a color correction coefficient for the green color channel may be expressed as ($S_G$), a color correction coefficient for the blue color channel may be expressed as ($S_B$). A color correction coefficient of one (S=1) may indicate that adjustment or correction of the respective color channel may be omitted, a color correction coefficient less than one (S<1) may indicate a reduction in the intensity of the respective color channel, and a color correction coefficient greater than, or exceeding, one (S>1) may indicate an increase in the intensity of the respective color channel. In some implementations, a defined color correction coefficient, such as one (S=1), may be identified for adjusting one or more of the color channels, such as the green color channel ($S_G$=1), which may indicate that adjustment or correction of the respective color channel based on the defined color correction coefficient of one (S=1) may be omitted.

A processed image may be obtained at 830. Obtaining the processed image at 830 may include adjusting or correcting color component values of respective pixels from the input image obtained at 810 based on the color correction information obtained at 820. For example, an input color component value of a pixel from the input image may be combined, such as multiplied by, a corresponding color correction coefficient to obtain a linearly desaturated corrected, adjusted, or processed color component value.

An adjusted color component value may be clipped or limited based on the defined limit of the range of values for the respective color channel. A color channel correction coefficient may be greater than one and multiplying an input color component value by a corresponding color correction coefficient greater than one may generate a value that exceeds the saturation value, which may be clipped or limited to the saturation value. Clipping a value (x) to the saturation value (MaxSat) may be expressed as the following:

$$\text{sat}(x) = \min(x, \text{MaxSat}). \quad \text{[Equation 1]}$$

For example, obtaining a linearly desaturated corrected color component value for the red color channel ($R_1$) based on an input red color component value (R) and a corresponding red color correction coefficient ($S_R$) may be expressed as the following:

$$R_1 = \text{sat}(S_R * R). \quad \text{[Equation 2]}$$

Obtaining a linearly desaturated corrected color component value for the green color channel ($G_1$) based on an input green color component value (G) and a corresponding green color correction coefficient ($S_G$) may be expressed as the following:

$$G_1 = \text{sat}(S_G * G). \quad \text{[Equation 3]}$$

In some implementations, the color correction coefficient for the green color channel ($S_G$) may be one, and the input green color component value (G) may be obtained as the linearly desaturated corrected color component value for the green color channel ($G_1$), which may be expressed as $G_1$=G.

Obtaining a linearly desaturated corrected color component value for the blue color channel ($B_1$) based on an input blue color component value (B) and a corresponding blue color correction coefficient ($S_B$) may be expressed as the following:

$$B_1 = \text{sat}(S_B * B). \quad \text{[Equation 4]}$$

A processed image obtained using color correction with linear desaturation may include inaccurate, artificial, or false color for one or more portions, such as one or more pixels, of the processed image. A graph of an example of color correction with linear desaturation 800 using a correction coefficient that has a value less than one is shown in FIG. 9.

Although not shown separately in FIG. 8, adjusted values for the pixels of an image may be included in an output, adjusted, or processed image which may be output to another unit of the image signal processor, stored in memory, or both.

Figure 9:
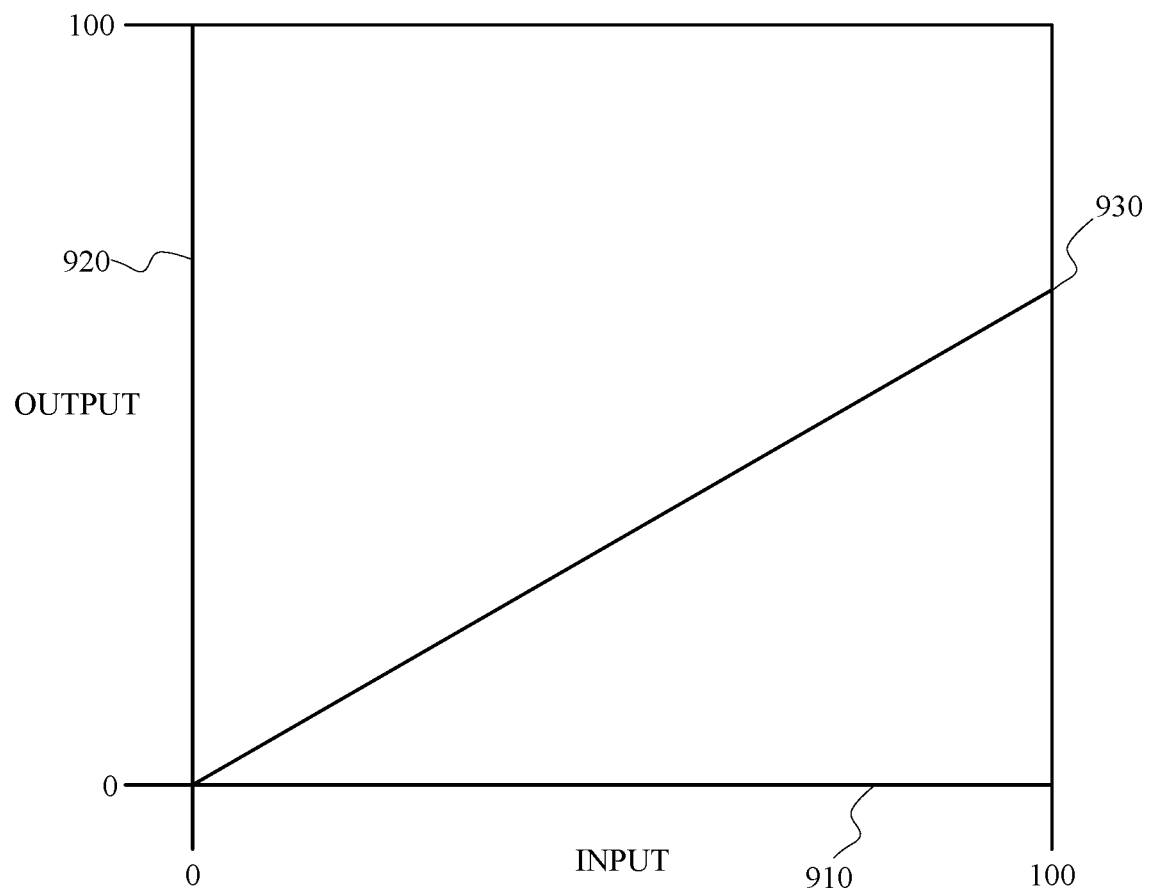
FIG. 9 is a graph of an example of color correction with linear desaturation using a correction coefficient that has a value less than one in accordance with implementations of this disclosure.

FIG. 9 is a graph of an example of color correction with linear desaturation using a correction coefficient that has a value less than one in accordance with implementations of this disclosure. The graph shown in FIG. 9, which may correspond with the example of color correction with linear desaturation 800 shown in FIG. 8, includes a horizontal, or x, axis 910 representing the input value for a color channel; a vertical, or y, axis 920 representing a resulting output or adjusted value for the color channel; and a line, curve, or slope, 930 representing the correction coefficient. For example, the correction coefficient may be 0.6 and applying the correction coefficient to a saturated input value of 100 may generate a desaturated output value of 60.

A processed image obtained using color correction with linear desaturation using a correction coefficient that has a value less than one may include inaccurate, artificial, or false color for one or more portions, such as one or more pixels, of the processed image.

For example, the input color component value for the red color channel (R) of a pixel may be at the saturation value (R=MaxSat), the color correction coefficient for the red color channel ($S_R$) may be less than one ($S_R<1$), the corresponding linearly desaturated corrected color component value for the red color channel ($R_1$) of the pixel may be less than the saturation value (MaxSat), and the processed image may include inaccurate, artificial, or false color for the respective pixel.

In another example, the input color component value for the blue color channel (B) of the pixel may be at the saturation value (B=MaxSat), the color correction coefficient for the blue color channel ($S_B$) may be less than one ($S_B<1$), the corresponding linearly desaturated corrected color component value for the blue color channel ($B_1$) of the pixel may be less than the saturation value (MaxSat), and the processed image may include inaccurate, artificial, or false color for the respective pixel.

For example, content captured by an input image may be illuminated by a cool, or blue, illuminant; bright white content may be captured in the input image; and pixels corresponding to the bright white content may have a red color component value of 100 (R=100), a green color component value of 100 (G=100), and a blue color component value of 100 (B=100), which may correspond with saturation clipping of the blue color component value. A red correction coefficient of one ($S_R=1$) may be identified for the red color channel, a green correction coefficient of one ($S_G=1$) may be identified for the green color channel, and a blue correction coefficient less than one, such as 0.5, ($S_B=0.5$) may be identified for the blue color channel, corresponding to the cool illuminant. Color correction with linear desaturation may reduce the blue color channel intensity for pixels corresponding to the white object. The linearly desaturated corrected color component value for the red color channel ($R_1$) may be 100 ($R_1=1*100=100$), the linearly desaturated corrected color component value for the green color channel ($G_1$) may be 100 ($G_1=1*100=100$), and the linearly desaturated corrected color component value for the blue color channel ($B_1$) may be 50 ($B_1=0.5*100=50$). The adjusted pixels may appear inaccurately or artificially red or pink.

Figure 10:
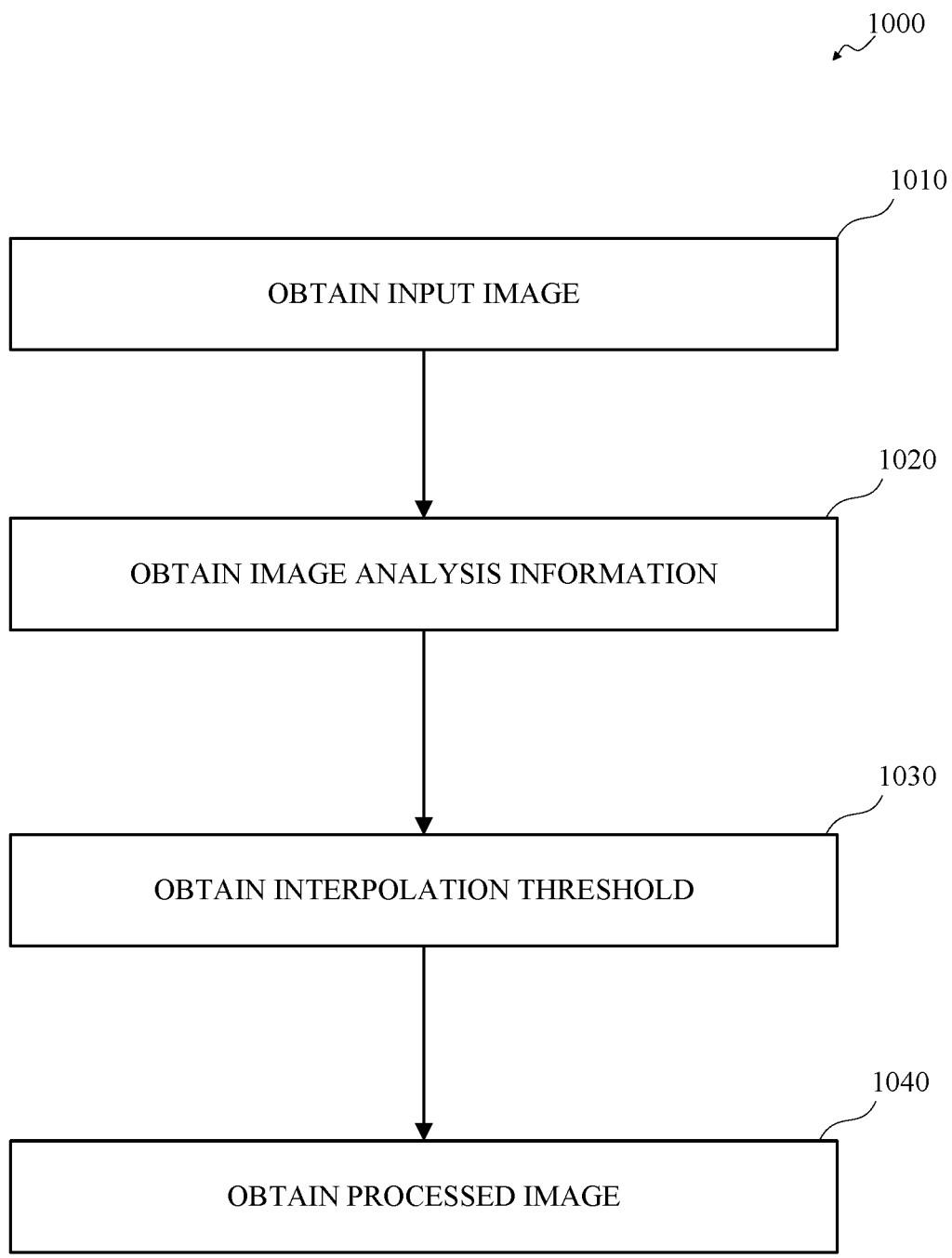
FIG. 10 is a flowchart of an example of color correction with linear interpolative desaturation in accordance with implementations of this disclosure.

FIG. 10 is a flowchart of an example of color correction with linear interpolative desaturation 1000 in accordance with implementations of this disclosure. Color correction with linear interpolative desaturation 1000 may be implemented in an image capture apparatus, such as the image capture apparatus 110 shown in FIG. 1, or the image capture apparatus 300 shown in FIG. 3. For example, a raw to raw unit, such as the raw to raw unit 544 of the image signal processor 500 shown in FIG. 5, may implement correction with linear interpolative desaturation 1000. Color correction with linear interpolative desaturation 1000 may be similar to color correction with linear desaturation 800 as shown in FIG. 8, except as described herein or otherwise clear from context.

Color correction with linear interpolative desaturation 1000 includes obtaining an input image at 1010, obtaining image analysis information at 1020, obtaining an interpolation threshold at 1030, and obtaining a processed image at 1040.

An input image may be obtained at 1010. For example, obtaining the input image at 1010 may be similar to obtaining an input image as shown at 810 in FIG. 8.

Image analysis information may be obtained at 1020. For example, obtaining the image analysis information may be similar to obtaining image analysis information as shown at 820 in FIG. 8.

An interpolation threshold (I) may be obtained at 1030. For example, the interpolation threshold (I) may be a defined value, which may be defined relative to the respective color correction coefficient (S). For example, an example of an interpolation threshold (I) defined relative to a respective color correction coefficient (S) may be expressed as the following:

$$I = 1/(2-S). \quad \text{[Equation 5]}$$

A processed image may be obtained at 1040. Obtaining the processed image may include obtaining corresponding color corrected values using linear interpolative desaturation (LID) based on the corresponding color correction coefficient (S).

An input color channel value (x) may be below, or less than, the interpolation threshold obtained at 1030 (x<I), and obtaining corresponding color corrected values using linear interpolative desaturation (LID) based on the corresponding color correction coefficient (S) may be similar to obtaining a linearly desaturated corrected color component value as shown at 830 in FIG. 8, which may be expressed as the following:

$$\text{LID}(S, x) = S * x. \quad \text{[Equation 6]}$$

An input color channel value (x) may be may be the saturation value (x=MaxSat) and the corresponding color corrected value obtained using color correction with linear interpolative desaturation 1000 based on the corresponding color correction coefficient (S) may be the saturation value, which may be expressed as the following:

$$\text{LID}(S, \text{MaxSat}) = \text{MaxSat}. \quad \text{[Equation 7]}$$

An input color channel value (x) may be at least, such as greater than or equal to, the interpolation threshold obtained at 1030 (x>=I), and obtaining corresponding color corrected values using linear interpolative desaturation (LID) based on the corresponding color correction coefficient (S) may include linear interpolation with respect to the input color component value (x), which may be expressed as the following:

$$\text{If } y \geq x, \text{LID}(S,y) \geq \text{LID}(S,x).\qquad\text{[Equation 8]}$$

For example, the interpolation threshold (I) may be 1/(2−S) and obtaining corresponding color corrected values using linear interpolative desaturation (LID) based on the corresponding color correction coefficient (S) may be expressed as the following:

$$\text{LID}(S,x) = \text{sat}(\max(S^*x, 2^*x-1)).\qquad\text{[Equation 9]}$$

In an example, obtaining a corrected color component value for the red color channel ($R_2$) using linear interpolative desaturation (LID) based on an input red color component value (R) and a corresponding red color correction coefficient ($S_R$) may be expressed as the following:

$$R_2 = \text{sat}(\text{LID}(S_R, R)).\qquad\text{[Equation 10]}$$

Obtaining corrected color component value for the green color channel ($G_2$) using linear interpolative desaturation (LID) based on an input green color component value (G) and a corresponding green color correction coefficient ($S_G$) may be expressed as the following:

$$G_2 = \text{sat}(\text{LID}(S_G, G)).\qquad\text{[Equation 11]}$$

In some implementations, the color correction coefficient for the green color channel ($S_G$) may be one, and the input green color component value (G) may be obtained as the linear interpolative desaturated corrected color component value for the green color channel ($G_2$), which may be expressed as $G_2 = G$.

Obtaining corrected color component value for the blue color channel ($B_2$) using linear interpolative desaturation (LID) based on an input blue color component value (B) and a corresponding blue color correction coefficient ($S_B$) may be expressed as the following:

$$B_2 = \text{sat}(\text{LID}(S_B, B)).\qquad\text{[Equation 12]}$$

Color correction with linear interpolative desaturation 1000 may reduce the inaccurate, artificial, or false color corresponding to color correction with linear desaturation as shown in FIG. 8. For example, the red color correction coefficient ($S_R$) and the blue color correction coefficient ($S_B$) may be near or greater than one, such as greater than 0.9, and the color accuracy of a pixel obtained using color correction with linear interpolative desaturation 1000 ($R_2$, $G_2$, $B_2$) may exceed the color accuracy of a corresponding pixel obtained using color correction with linear desaturation as shown in FIGS. 8 and 9 ($R_1$, $G_1$, $B_1$).

A processed image obtained using color correction with linear interpolative desaturation based on correction coefficients significantly below one, such as at 0.9 or below, may include inaccurate, artificial, or false color for one or more portions, such as one or more pixels, of the processed image. A graph of an example of color correction with linear interpolative desaturation 1000 based on correction coefficients significantly below one is shown in FIG. 11.

Although not shown separately in FIG. 10, adjusted values for the pixels of an image may be included in an output, adjusted, or processed image which may be output to another unit of the image signal processor, stored in memory, or both.

Figure 11:
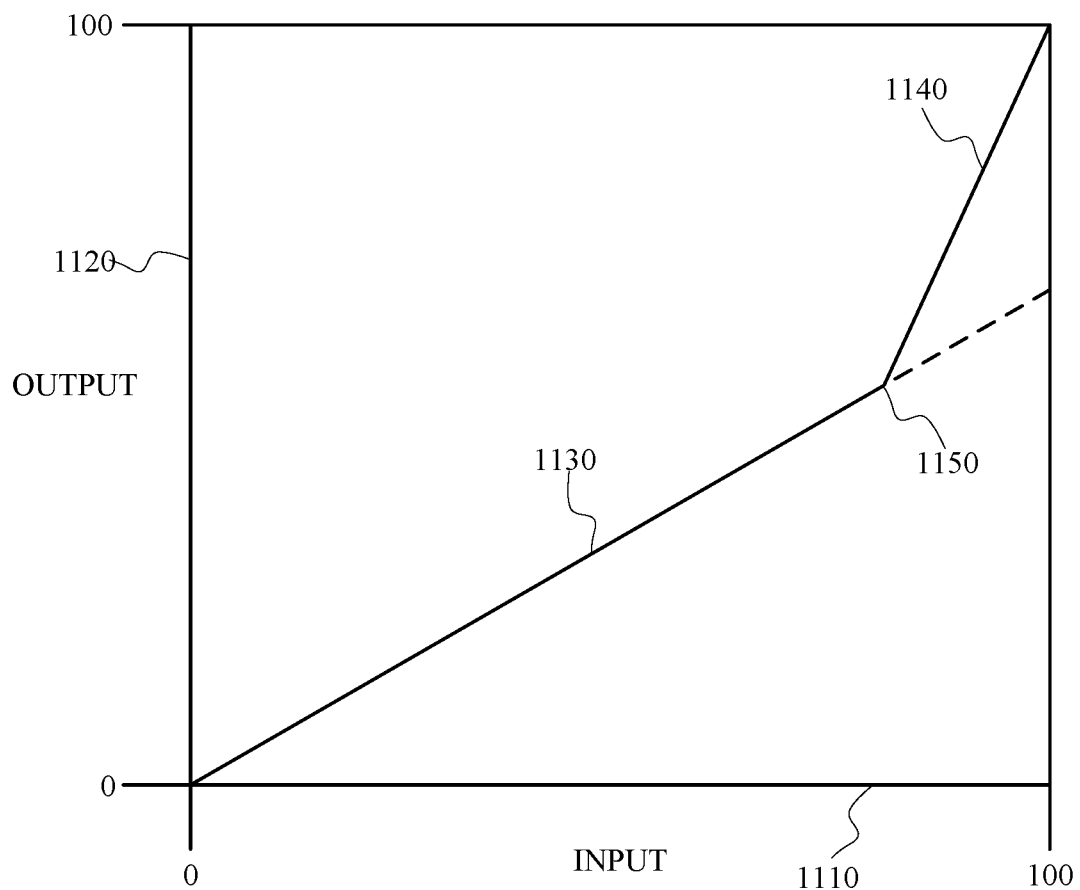
FIG. 11 is a graph of an example of color correction with linear interpolative desaturation using a correction coefficient that has a value significantly less than one in accordance with implementations of this disclosure.

FIG. 11 is a graph of an example of color correction with linear interpolative desaturation using a correction coefficient that has a value significantly less than one in accordance with implementations of this disclosure. The graph shown in FIG. 11, which may correspond with the example of color correction with linear interpolative desaturation 1000 shown in FIG. 10, includes a horizontal, or x, axis 1110 representing the input value for a color channel, a vertical, or y, axis 1120 representing a resulting output or adjusted value for the color channel, a line, curve, or slope 1130 representing the correction coefficient, and a line, curve, or slope 1140 representing the linear interpolative desaturation.

The line 1130 representing the correction coefficient is shown with a solid line portion between zero and an interpolation threshold 1150, such as 60, and a broken line portion between the interpolation threshold 1150 and the maximum input value. The solid line portion of the line 1130 representing the correction coefficient indicates that an input color channel value (x) may be below, or less than, the interpolation threshold 1150 (x<I), and obtaining corresponding color corrected values using linear interpolative desaturation (LID) based on the corresponding color correction coefficient (S) as described in relation to FIG. 10 and as shown in Equation 9, which may be similar to obtaining a linearly desaturated corrected color component value as shown at 830 in FIG. 8.

The line 1140 representing linear interpolative desaturation indicates that an input color channel value (x) at least, such as greater than or equal to, the interpolation threshold 1150 (x>=I), and obtaining corresponding color corrected values using linear interpolative desaturation (LID) based on the corresponding color correction coefficient (S) may include linear interpolation with respect to the input color component value (x) as described in relation to FIG. 10 and as shown in Equation 9.

A processed image obtained using color correction with linear interpolative desaturation based on correction coefficients significantly below one, such as at 0.9 or below, may include inaccurate, artificial, or false color for one or more portions, such as one or more pixels, of the processed image.

For example, an input color channel value (x) of a first pixel may be 50, the corresponding color correction coefficient (S) may be 0.6, and the corrected color component value for the color channel obtained using color correction with linear interpolative desaturation may be 30. The input color channel value (x) of a second pixel may be 100, the corresponding color correction coefficient (S) may be 1.0, and the corrected color component value for the color channel obtained using color correction with linear interpolative desaturation may be 100.

In an example, pixels from an input image, such as pixels corresponding to gray content, may have unsaturated values near the saturation value, such as within 25 percent of the saturation value, such as a red color component value of 40, a green color component value of 40, and a blue color component value of 80. The content captured by the input image may have a relatively blue light source, and a red correction coefficient of one may be identified for the red color channel, a green correction coefficient of one may be identified for the green color channel, and a blue correction coefficient less than one, such as 0.5, may be identified for the blue color channel.

Color correction with linear desaturation may include identifying a color corrected red component value of 40, a color corrected green component value of 40, and a color corrected blue component value of 40. Color correction with linear interpolative desaturation may reduce the blue color channel intensity for the pixel corresponding to the gray object inaccurately. For example, the color corrected red color component value may be 40, the color corrected green color component value may be 40, and the color corrected blue color component value may be 60, which may appear artificially or inaccurately blue.

FIG. 12 is a flowchart of an example of color correction with desaturation control 1200 in accordance with implementations of this disclosure. Color correction with desaturation control 1200 may be implemented in an image capture apparatus, such as the image capture apparatus 110 shown in FIG. 1, or the image capture apparatus 300 shown in FIG. 3. For example, a raw to raw unit, such as the raw to raw unit 544 of the image signal processor 500 shown in FIG. 5, may implement color correction with desaturation control 1200. Color correction with desaturation control 1200 may be similar to color correction with linear desaturation 800 as shown in FIG. 8, or color correction with linear interpolative desaturation 1000 as shown in FIG. 10, except as described herein or otherwise clear from context.

Color correction with desaturation control 1200 includes obtaining an input image at 1210, obtaining image analysis information at 1220, obtaining an interpolation threshold at 1230, and obtaining a processed image at 1240.

An input image may be identified at 1210. For example, identifying the input image at 1210 may be similar to identifying an input image as shown at 810 in FIG. 8 or at 1010 in FIG. 10.

Image analysis information may be obtained at 1220. For example, obtaining the image analysis information at 1220 may be similar to obtaining image analysis information as shown at 820 in FIG. 8 or obtaining image analysis information as shown at 1020 in FIG. 10.

An interpolation threshold may be obtained at 1230. For example, obtaining the interpolation threshold at 1230 may be similar to obtaining an interpolation threshold as shown at 1030 in FIG. 10.

A processed image may be obtained at 1240. Obtaining the processed image may include obtaining corresponding color corrected values ($R_3$, $G_3$, $B_3$) using desaturation control (K) based on the corresponding color correction coefficient (S).

The red color correction coefficient ($S_R$) may be at least, such as greater than or equal to, one ($S_R >= 1$) and the blue color correction coefficient ($S_B$) may be at least, such as greater than or equal to, one ($S_B >= 1$), as indicated by the broken line to 1250, and obtaining the processed image may include obtaining corresponding color corrected values ($R_3$, $G_3$, $B_3$) using desaturation control (K) based on the corresponding color correction coefficient (S) may be similar to obtaining linearly desaturated corrected color component values ($R_1$, $G_1$, $B_1$) as shown at 1252 and as described in relation to FIG. 8 and in Equations 2 and 4. For example, a color corrected red component value may be obtained by multiplying the red color correction coefficient ($S_R$) by the input red component value (R) and a color corrected blue component value may be obtained by multiplying the blue color correction coefficient ($S_B$) by the input blue component value (B).

The red color correction coefficient ($S_R$) may be less than one ($S_R < 1$) and may be less than the blue color correction coefficient ($S_R < S_B$), as indicated by the broken line to 1260, and obtaining the processed image may include obtaining corresponding color corrected values ($R_3$, $G_3$, $B_3$) using desaturation control (K) proportional to the red color channel (R) based on the corresponding color correction coefficient (S) as shown at 1262, which may be expressed as the following:

$$K = LID(S_R, R)/S_R * R.$$  [Equation 13]

For example, obtaining a corrected color component value for the red color channel ($R_3$) using desaturation control (K) based on an input red color component value (R) and a corresponding red color correction coefficient ($S_R$) may be expressed as the following:

$$R_3 = K * S_R * R; \text{ or}$$

$$R_3 = LID(S_R, R).$$  [Equation 14]

Obtaining corrected color component value for the green color channel ($G_3$) using desaturation control (K) based on an input green color component value (G) and a corresponding green color correction coefficient ($S_G$) may be expressed as the following:

$$G_3 = sat(K * G).$$  [Equation 15]

Obtaining corrected color component value for the blue color channel ($B_3$) using desaturation control (K) based on an input blue color component value (B) and a corresponding blue color correction coefficient ($S_B$) may be expressed as the following:

$$B_3 = sat(K * S_B * B).$$  [Equation 16]

The blue color correction coefficient ($S_B$) may be less than one ($S_B < 1$) and may be less than the red color correction coefficient ($S_B < S_R$), as indicated by the broken line to 1270, and obtaining the processed image may include obtaining corresponding color corrected values ($R_3$, $G_3$, $B_3$) using desaturation control (K) proportional to the blue color channel (B) based on the corresponding color correction coefficient (S) as shown at 1272, which may be expressed as the following:

$$K = LID(S_B, B)/S_B * B.$$  [Equation 17]

For example, obtaining a corrected color component value for the red color channel ($R_3$) using desaturation control (K) based on an input red color component value (R) and a corresponding red color correction coefficient ($S_R$) may be expressed as the following:

$$R_3 = sat(K * S_R * R).$$  [Equation 18]

Obtaining corrected color component value for the green color channel ($G_3$) using desaturation control (K) based on an input green color component value (G) and a corresponding green color correction coefficient ($S_G$) may be expressed as the following:

$$G_3 = sat(K * G).$$  [Equation 19]

Obtaining corrected color component value for the blue color channel ($B_3$) using desaturation control (K) based on an input blue color component value (B) and a corresponding blue color correction coefficient ($S_B$) may be expressed as the following:

$$B_3 = K * S_B * B; \text{ or}$$

$$B_3 = LID(S_B, B).$$  [Equation 20]

The red color correction coefficient ($S_R$) may be less than one ($S_R < 1$), the blue color correction coefficient ($S_B$) may be less than one ($S_B < 1$) and may be equal to the red color correction coefficient ($S_B = S_R$), and obtaining the processed image may include obtaining corresponding color corrected values ($R_3$, $G_3$, $B_3$) using desaturation control (K) proportional to the red color channel (B) as shown in Equations 13-16 or using desaturation control (K) proportional to the blue color channel (B) as shown in Equations 17-20.

Color correction with desaturation control 1200 may reduce the inaccurate, artificial, or false color corresponding to color correction with linear interpolative desaturation as shown in FIG. 10. For example, the correction coefficients may be significantly below one, such as at 0.9 or below, and the color accuracy of a pixel obtained using color correction with desaturation control 1200 ($R_3$, $G_3$, $B_3$) may exceed the color accuracy of a corresponding pixel obtained using linear interpolative desaturation 1000 as shown in FIGS. 10 and 11 ($R_2$, $G_2$, $B_2$).

A processed image obtained using color correction with desaturation control 1200 may include inaccurately or artificially brightened or saturated values for one or more portions, such as one or more pixels, of the processed image, having color component values close to saturation.

Although not shown separately in FIG. 12, adjusted values for the pixels of an image may be included in an output, adjusted, or processed image which may be output to another unit of the image signal processor, stored in memory, or both.

FIG. 13 is a flowchart of an example of color correction with adaptive desaturation control 1300 in accordance with implementations of this disclosure. Color correction with adaptive desaturation control 1300 may be implemented in an image capture apparatus, such as the image capture apparatus 110 shown in FIG. 1, or the image capture apparatus 300 shown in FIG. 3. For example, a raw to raw unit, such as the raw to raw unit 544 of the image signal processor 500 shown in FIG. 5, may implement color correction with adaptive desaturation control 1300. Color correction with adaptive desaturation control 1300 may be similar to color correction with desaturation control 1300 as shown in FIG. 13, except as described herein or otherwise clear from context.

Color correction with desaturation control 1300 includes obtaining an input image at 1310, obtaining image analysis information at 1320, obtaining an interpolation threshold at 1330, and obtaining a processed image at 1340.

An input image may be identified at 1310. For example, identifying the input image at 1310 may be similar to identifying an input image as shown at 810 in FIG. 8 or at 1010 in FIG. 10.

Image analysis information may be obtained at 1320. For example, obtaining the image analysis information at 1320 may be similar to obtaining image analysis information as shown at 820 in FIG. 8 or obtaining image analysis information as shown at 1020 in FIG. 10.

An interpolation threshold may be obtained at 1330. For example, obtaining the interpolation threshold at 1330 may be similar to obtaining an interpolation threshold as shown at 1030 in FIG. 10.

A processed image may be obtained at 1340. Obtaining the processed image may include obtaining corresponding color corrected values ($R_3$, $G_3$, $B_3$) using desaturation control (K) based on the corresponding color correction coefficient (S) and obtaining corresponding color corrected values ($R_4$, $G_4$, $B_4$) using adaptive desaturation control (ADC) based on the color corrected values ($R_3$, $G_3$, $B_3$) obtained using desaturation control (K) and the green color channel (G).

The red color correction coefficient ($S_R$) may be at least, such as greater than or equal to, one ($S_R >= 1$) and the blue color correction coefficient ($S_B$) may be at least, such as greater than or equal to, one ($S_B >= 1$), as indicated by the broken line to 1350, and obtaining the processed image may include obtaining corresponding color corrected values ($R_3$, $G_3$, $B_3$) using desaturation control (K) based on the corresponding color correction coefficient (S) may be similar to obtaining linearly desaturated corrected color component values ($R_1$, $G_1$, $B_1$) as shown at 1352 and as described in relation to FIG. 8 and in Equations 2 and 4.

The red color correction coefficient ($S_R$) may be less than one ($S_R < 1$) and may be less than the blue color correction coefficient ($S_R < S_B$), as indicated by the broken line to 1360, and obtaining the processed image may include obtaining corresponding color corrected values ($R_3$, $G_3$, $B_3$) using desaturation control (K) proportional to the red color channel (R) based on the corresponding color correction coefficient (S) as shown at 1362, which may be expressed as shown in Equation 13.

For example, obtaining a corrected color component value for the red color channel ($R_3$) using desaturation control (K) based on an input red color component value (R) and a corresponding red color correction coefficient ($S_R$) may be expressed as shown in Equation 14.

Obtaining corrected color component value for the green color channel ($G_3$) using desaturation control (K) based on an input green color component value (G) and a corresponding green color correction coefficient ($S_G$) may be expressed as shown in Equation 15.

Obtaining corrected color component value for the blue color channel ($B_3$) using desaturation control (K) based on an input blue color component value (B) and a corresponding blue color correction coefficient ($S_B$) may be expressed as shown in Equation 16.

The blue color correction coefficient ($S_B$) may be less than one ($S_B < 1$) and may be less than the red color correction coefficient ($S_B < S_R$), as indicated by the broken line to 1370, and obtaining the processed image may include obtaining corresponding color corrected values ($R_3$, $G_3$, $B_3$) using desaturation control (K) proportional to the blue color channel (B) based on the corresponding color correction coefficient (S) as shown at 1372, which may be expressed as shown in Equation 17.

For example, obtaining a corrected color component value for the red color channel ($R_3$) using desaturation control (K) based on an input red color component value (R) and a corresponding red color correction coefficient ($S_R$) may be expressed as shown in Equation 18.

Obtaining corrected color component value for the green color channel ($G_3$) using desaturation control (K) based on an input green color component value (G) and a corresponding green color correction coefficient ($S_G$) may be expressed as shown in Equation 19.

Obtaining corrected color component value for the blue color channel ($B_3$) using desaturation control (K) based on an input blue color component value (B) and a corresponding blue color correction coefficient ($S_B$) may be expressed as shown in Equation 20.

The red color correction coefficient ($S_R$) may be less than one ($S_R < 1$), the blue color correction coefficient ($S_B$) may be less than one ($S_B < 1$) and may be equal to the red color correction coefficient ($S_B = S_R$), and obtaining the processed image may include obtaining corresponding color corrected values ($R_3$, $G_3$, $B_3$) using desaturation control (K) proportional to the red color channel (B) as shown in Equations 13-16 or using desaturation control (K) proportional to the blue color channel (B) as shown in Equations 17-20.

Obtaining the processed image may include obtaining color corrected values ($R_4$, $G_4$, $B_4$) using adaptive desaturation control (ADC) as shown at 1380 based on the color corrected values ($R_3$, $G_3$, $B_3$) obtained using desaturation control (K) and the green color channel (G) may be expressed as the following:

$$ADC = G/G_3; \text{ or}$$

$$ADC = \max(1/K, G/\text{MaxSat}). \quad \text{[Equation 21]}$$

For example, obtaining a corrected color component value for the red color channel ($R_4$) using adaptive desaturation control (ADC) may be expressed as the following:

$$R_4 = ADC * R_3. \quad \text{[Equation 22]}$$

Obtaining corrected color component value for the green color channel ($G_4$) using adaptive desaturation control (ADC) may be expressed as the following:

$$G_4 = ADC * G_3; \text{ or}$$

$$G_4 = G. \quad \text{[Equation 23]}$$

Obtaining the corrected color component value for the green color channel ($G_4$) as shown in Equation 23, such that $G_4 = G$, prevents loss of information for the green channel. Color correcting the red channel and blue channel such that the input value of the green color channel is preserved may improve color correction efficiency and color accuracy.

Obtaining corrected color component value for the blue color channel ($B_4$) using adaptive desaturation control (ADC) may be expressed as the following:

$$B_4 ADC * B_3. \quad \text{[Equation 24]}$$

Color correction with adaptive desaturation control 1300 may reduce the inaccurately or artificially brightened or saturated values corresponding to color correction with desaturation control as shown in FIG. 12.

Although not shown separately in FIG. 13, adjusted values for the pixels of an image may be included in an output, adjusted, or processed image which may be output to another unit of the image signal processor, stored in memory, or both.

Where certain elements of these implementations may be partially or fully implemented using known components, those portions of such known components that are necessary for an understanding of the present disclosure have been described, and detailed descriptions of other portions of such known components have been omitted so as not to obscure the disclosure.

In the present specification, an implementation showing a singular component should not be considered limiting; rather, the disclosure is intended to encompass other implementations including a plurality of the same component, and vice-versa, unless explicitly stated otherwise herein.

Further, the present disclosure encompasses present and future known equivalents to the components referred to herein by way of illustration.

As used herein, the term "bus" is meant generally to denote any type of interconnection or communication architecture that may be used to communicate data between two or more entities. The "bus" could be optical, wireless, infrared or another type of communication medium. The exact topology of the bus could be, for example, standard "bus," hierarchical bus, network-on-chip, address-event-representation (AER) connection, or other type of communication topology used for accessing, for example, different memories in a system.

As used herein, the terms "computer," "computing device," and "computerized device" include, but are not limited to, personal computers (PCs) and minicomputers (whether desktop, laptop, or otherwise), mainframe computers, workstations, servers, personal digital assistants (PDAs), handheld computers, embedded computers, programmable logic devices, personal communicators, tablet computers, portable navigation aids, Java 2 Platform, Micro Edition (J2ME) equipped devices, cellular telephones, smart phones, personal integrated communication or entertainment devices, or literally any other device capable of executing a set of instructions.

As used herein, the term "computer program" or "software" is meant to include any sequence of machine cognizable steps which perform a function. Such program may be rendered in virtually any programming language or environment including, for example, C/C++, C#, Fortran, COBOL, MATLAB™, PASCAL, Python, assembly language, markup languages, such as HTML, Standard Generalized Markup Language (SGML), XML, Voice Markup Language (VoxML), as well as object-oriented environments such as the Common Object Request Broker Architecture (CORBA), Java™ (including J2ME, Java Beans), and/or Binary Runtime Environment, such as Binary Runtime Environment for Wireless (BREW).

As used herein, the terms "connection," "link," "transmission channel," "delay line," and "wireless" mean a causal link between any two or more entities (whether physical or logical/virtual) which enables information exchange between the entities.

As used herein, the terms "integrated circuit," "chip," and "IC" are meant to refer to an electronic circuit manufactured by the patterned diffusion of trace elements into the surface of a thin substrate of semiconductor material. By way of non-limiting example, integrated circuits may include field programmable gate arrays (FPGAs), a programmable logic device (PLD), reconfigurable computer fabrics (RCFs), systems on a chip (SoC), application-specific integrated circuits (ASICs), and/or other types of integrated circuits.

As used herein, the term "memory" includes any type of integrated circuit or other storage device adapted for storing digital data, including, without limitation, read-only memory (ROM), programmable ROM (PROM), electrically erasable PROM (EEPROM), dynamic random access memory (DRAM), Mobile DRAM, synchronous DRAM (SDRAM), Double Data Rate 2 (DDR/2) SDRAM, extended data out (EDO)/fast page mode (FPM), reduced latency DRAM (RLDRAM), static RAM (SRAM), "flash" memory, such as NAND/NOR, memristor memory, and pseudo SRAM (PSRAM).

As used herein, the terms "microprocessor" and "digital processor" are meant generally to include digital processing devices. By way of non-limiting example, digital processing devices may include one or more of digital signal processors (DSPs), reduced instruction set computers (RISC), general-purpose complex instruction set computing (CISC) processors, microprocessors, gate arrays, such as field programmable gate arrays, PLDs, reconfigurable computer fabrics (RCFs), array processors, secure microprocessors, application-specific integrated circuits (ASICs), and/or other digital processing devices. Such digital processors may be contained on a single unitary IC die, or distributed across multiple components.

As used herein, the term "network interface" refers to any signal, data, and/or software interface with a component, network, and/or process. By way of non-limiting example, a network interface may include one or more of FireWire, such as FW400, FW110, and/or other variations, USB, such as USB2, Ethernet, such as 10/100, 10/100/1000 (Gigabit Ethernet, 10-Gig-E, and/or other Ethernet implementations), MoCA, Coaxsys, such as TVnet™, radio frequency tuner, such as in-band or out-of-band, cable modem, and/or other radio frequency tuner protocol interfaces, Wi-Fi (802.11), WiMAX (802.16), personal area network (PAN), such as 802.15, cellular, such as 3G, LTE/LTE-A/TD-LTE, GSM, and/or other cellular technology, IrDA families, and/or other network interfaces.

As used herein, the term "Wi-Fi" includes one or more of IEEE-Std. 802.11, variants of IEEE-Std. 802.11, standards related to IEEE-Std. 802.11, such as 802.11 a/b/g/n/s/v, and/or other wireless standards.

As used herein, the term "wireless" means any wireless signal, data, communication, and/or other wireless interface. By way of non-limiting example, a wireless interface may include one or more of Wi-Fi, Bluetooth, 3G (3GPP/3GPP2), High Speed Downlink Packet Access/High Speed Uplink Packet Access (HSDPA/HSUPA), Time Division Multiple Access (TDMA), Code Division Multiple Access (CDMA) (such as, IS-95A, Wideband CDMA (WCDMA), and/or other wireless technology), Frequency Hopping Spread Spectrum (FHSS), Direct Sequence Spread Spectrum (DSSS), Global System for Mobile communications (GSM), PAN/802.15, WiMAX (802.16), 802.20, narrowband/Frequency Division Multiple Access (FDMA), Orthogonal Frequency Division Multiplex (OFDM), Personal Communication Service (PCS)/Digital Cellular System (DCS), LTE/LTE-Advanced (LTE-A)/Time Division LTE (TD-LTE), analog cellular, cellular Digital Packet Data (CDPD), satellite systems, millimeter wave or microwave systems, acoustic, infrared (i.e., IrDA), and/or other wireless interfaces.

As used herein, the term "robot" may be used to describe an autonomous device, autonomous vehicle, computer, artificial intelligence (AI) agent, surveillance system or device, control system or device, and/or other computerized device capable of autonomous operation.

As used herein, the terms "camera," or variations thereof, and "image capture device," or variations thereof, may be used to refer to any imaging device or sensor configured to capture, record, and/or convey still and/or video imagery which may be sensitive to visible parts of the electromagnetic spectrum, invisible parts of the electromagnetic spectrum, such as infrared, ultraviolet, and/or other energy, such as pressure waves.

While certain aspects of the technology are described in terms of a specific sequence of steps of a method, these descriptions are illustrative of the broader methods of the disclosure and may be modified by the particular application. Certain steps may be rendered unnecessary or optional under certain circumstances. Additionally, certain steps or functionality may be added to the disclosed implementations, or the order of performance of two or more steps may be permuted. All such variations are considered to be encompassed within the disclosure.

What is claimed is:

1. A non-transitory computer-readable storage medium, comprising executable instructions that, when executed by a processor, facilitate performance of operations, comprising:
    obtaining, by an image signal processor, from an image sensor, an input image signal representing an input image;
    obtaining, by the image signal processor, color correction information for the input image;
    obtaining a color corrected image based on the input image using color correction with desaturation control such that inaccurate colorization of the color corrected image is minimized, wherein obtaining the color corrected image includes:
        obtaining a color corrected pixel based on an input pixel from the input image using color correction with desaturation control such that inaccurate colorization of the color corrected pixel is minimized;
        in response to a determination that, for the input pixel, the color correction information includes a blue component correction coefficient and a red component correction coefficient that is less than one and is less than the blue component correction coefficient, desaturation control includes desaturation control proportional to the red color channel;
        in response to a determination that, for the input pixel, the color correction information includes a red component correction coefficient and a blue component correction coefficient that is less than one and is less than the red component correction coefficient, desaturation control includes desaturation control proportional to the blue color channel; and
        including the color corrected pixel in the color corrected image; and
    outputting the color corrected image.

2. The non-transitory computer-readable storage medium of claim 1, wherein:
    obtaining the color corrected pixel based on the input pixel from the input image using color correction with desaturation control include:
        obtaining a desaturation control color corrected pixel using desaturation control based on the input pixel; and
        obtaining an adaptive desaturation control color corrected pixel using adaptive desaturation control based on the desaturation control color corrected pixel, such that inaccurate color brightness increase is minimized; and
    including the color corrected pixel in the color corrected image includes including the adaptive desaturation control color corrected pixel in the color corrected image.

3. The non-transitory computer-readable storage medium of claim 2, wherein obtaining the adaptive desaturation control color corrected pixel using adaptive desaturation control includes adaptive desaturation control based on a ratio between a green color channel value of the input pixel and a green color channel value of the desaturation control color corrected pixel.

4. The non-transitory computer-readable storage medium of claim 2, wherein obtaining the adaptive desaturation control color corrected pixel using adaptive desaturation control includes obtaining the adaptive desaturation control color corrected pixel in response to a determination that, for the input pixel, the color correction information includes a blue component correction coefficient and a red component correction coefficient, wherein at least one of the blue component correction coefficient or the red component correction coefficient is less than one.

5. The non-transitory computer-readable storage medium of claim 2, wherein obtaining the adaptive desaturation control color corrected pixel using adaptive desaturation control includes omitting obtaining the adaptive desaturation control color corrected pixel in response to a determination that, for the input pixel, the color correction information includes a blue component correction coefficient and a red component correction coefficient, wherein the blue component correction coefficient is at least one and the red component correction coefficient is at least one.

6. A method comprising:
obtaining, by an image signal processor, from an image sensor, an input image signal representing an input image;
obtaining, by the image signal processor, color correction information for the input image;
obtaining a color corrected image based on the input image using color correction with desaturation control such that inaccurate colorization of the color corrected image is minimized wherein obtaining the color corrected image includes:
   obtaining a color corrected pixel based on an input pixel from the input image using color correction with desaturation control such that inaccurate colorization of the color corrected pixel is minimized;
   in response to a determination that, for the input pixel, the color correction information includes a blue component correction coefficient and a red component correction coefficient that is less than one and is less than the blue component correction coefficient, desaturation control includes desaturation control proportional to the red color channel;
   in response to a determination that, for the input pixel, the color correction information includes a red component correction coefficient and a blue component correction coefficient that is less than one and is less than the red component correction coefficient, desaturation control includes desaturation control proportional to the blue color channel; and
   including the color corrected pixel in the color corrected image; and
outputting the color corrected image.

7. The method of claim 6, wherein:
obtaining the color corrected pixel based on the input pixel from the input image using color correction with desaturation control include:
   obtaining a desaturation control color corrected pixel using desaturation control based on the input pixel; and
   obtaining an adaptive desaturation control color corrected pixel using adaptive desaturation control based on the desaturation control color corrected pixel, such that inaccurate color brightness increase is minimized; and
including the color corrected pixel in the color corrected image includes including the adaptive desaturation control color corrected pixel in the color corrected image.

8. The method of claim 7, wherein obtaining the adaptive desaturation control color corrected pixel using adaptive desaturation control includes adaptive desaturation control based on a ratio between a green color channel value of the input pixel and a green color channel value of the desaturation control color corrected pixel.

9. The method of claim 7, wherein obtaining the adaptive desaturation control color corrected pixel using adaptive desaturation control includes obtaining the adaptive desaturation control color corrected pixel in response to a determination that, for the input pixel, the color correction information includes a blue component correction coefficient and a red component correction coefficient, wherein at least one of the blue component correction coefficient or the red component correction coefficient is less than one.

10. The method of claim 7, wherein obtaining the adaptive desaturation control color corrected pixel using adaptive desaturation control includes omitting obtaining the adaptive desaturation control color corrected pixel in response to a determination that, for the input pixel, the color correction information includes a blue component correction coefficient and a red component correction coefficient, wherein the blue component correction coefficient is at least one and the red component correction coefficient is at least one.

11. An apparatus comprising:
an image sensor;
an image signal processor configured to:
   obtain, from the image sensor, an input image signal representing an input image;
   obtain color correction information for the input image;
   obtain a color corrected image based on the input image using color correction with desaturation control such that inaccurate colorization of the color corrected image is minimized, wherein the processor is configured to obtain the color corrected image by:
      obtaining a color corrected pixel based on an input pixel from the input image using color correction with desaturation control such that inaccurate colorization of the color corrected pixel is minimized;
      in response to a determination that, for the input pixel, the color correction information includes a blue component correction coefficient and a red component correction coefficient that is less than one and is less than the blue component correction coefficient, desaturation control includes desaturation control proportional to the red color channel;
      in response to a determination that, for the input pixel, the color correction information includes a red component correction coefficient and a blue component correction coefficient that is less than one and is less than the red component correction coefficient, desaturation control includes desaturation control proportional to the blue color channel; and
      including the color corrected pixel in the color corrected image; and
   output the color corrected image.

12. The apparatus of claim 11, wherein the processor is configured to:
obtain the color corrected pixel based on the input pixel from the input image using color correction with desaturation control by:
   obtaining a desaturation control color corrected pixel using desaturation control based on the input pixel; and
   obtaining an adaptive desaturation control color corrected pixel using adaptive desaturation control based on the desaturation control color corrected pixel, such that inaccurate color brightness increase is minimized; and
include the color corrected pixel in the color corrected image by including the adaptive desaturation control color corrected pixel in the color corrected image.

13. The apparatus of claim 12, wherein the processor is configured to obtain the adaptive desaturation control color corrected pixel using adaptive desaturation control includes adaptive desaturation control based on a ratio between a green color channel value of the input pixel and a green color channel value of the desaturation control color corrected pixel.

14. The apparatus of claim 12, wherein the processor is configured to obtain the adaptive desaturation control color corrected pixel using adaptive desaturation control by:
obtaining the adaptive desaturation control color corrected pixel in response to a determination that, for the input pixel, the color correction information includes a blue component correction coefficient and a red component correction coefficient, wherein at least one of the blue component correction coefficient or the red component correction coefficient is less than one; and
omitting obtaining the adaptive desaturation control color corrected pixel in response to a determination that the blue component correction coefficient is at least one and the red component correction coefficient is at least one.

\* \* \* \* \*